(12) United States Patent
    Ban et al.

(10) Patent No.: US 11,100,031 B2
(45) Date of Patent: Aug. 24, 2021

(54) MEMORY SYSTEM, SEMICONDUCTOR INTEGRATED CIRCUIT, AND METHOD THEREFOR

(71) Applicant: KIOXIA CORPORATION, Tokyo (JP)

(72) Inventors: Koichiro Ban, Kawasaki Kanagawa (JP); Tsuyoshi Kogawa, Kawasaki Kanagawa (JP); Junji Wadatsumi, Tokyo (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 16/807,094

(22) Filed: Mar. 2, 2020

(65) Prior Publication Data

US 2021/0081345 A1 Mar. 18, 2021

(30) Foreign Application Priority Data

Sep. 13, 2019 (JP) .............................. JP2019-167216

(51) Int. Cl.
   *G06F 13/40* (2006.01)
   *G06F 13/42* (2006.01)
   *G06F 3/06* (2006.01)

(52) U.S. Cl.
   CPC .......... *G06F 13/405* (2013.01); *G06F 3/0658* (2013.01); *G06F 3/0688* (2013.01); *G06F 13/4243* (2013.01); *G06F 13/4295* (2013.01)

(58) Field of Classification Search
   CPC .. G06F 13/405; G06F 13/4295; G06F 3/0688; G06F 3/0658; G06F 13/4243
   See application file for complete search history.

(56) References Cited

U.S. PATENT DOCUMENTS

| | | | | |
|---|---|---|---|---|
| 5,581,361 | A * | 12/1996 | You .................... | H04N 5/926 360/48 |
| 6,452,985 | B1 * | 9/2002 | Hatakeyama ..... | H03M 13/3961 375/341 |
| 9,092,362 | B1 * | 7/2015 | Alcantara ............... | G06F 11/10 |
| 2002/0186322 | A1 * | 12/2002 | Mair ..................... | H04N 7/025 348/484 |

(Continued)

FOREIGN PATENT DOCUMENTS

JP 2018-74550 A 5/2018

*Primary Examiner* — Farley Abad
(74) *Attorney, Agent, or Firm* — Kim & Stewart LLP

(57) ABSTRACT

A memory system includes a first nonvolatile memory, a first bridge circuit connected to the memory, a second nonvolatile memory, a second bridge circuit connected to the second memory and connected to the first circuit, and a controller connected to the first circuit and configured to output, to the first circuit, first data to be stored in the first memory and second data to be stored in the second memory, the first and second data being mapped to multiplexing symbols. The first bridge circuit is configured to, upon receipt of the multiplexing symbols, extract the first data from the symbols, store the first data in the first memory, generate third data based on the second data to insert the generated third data into the multiplexing symbols where the first data was mapped, and output to the second circuit the multiplexing symbols into which the third data has been inserted.

19 Claims, 17 Drawing Sheets

(56) References Cited

U.S. PATENT DOCUMENTS

| | | | |
|---|---|---|---|
| 2007/0229320 A1* | 10/2007 | Bae | H03M 5/145 |
| | | | 341/50 |
| 2013/0170583 A1 | 7/2013 | Ichiyama et al. | |
| 2013/0188631 A1* | 7/2013 | Nishikawa | H04L 27/2615 |
| | | | 370/344 |
| 2019/0087121 A1* | 3/2019 | Kobayashi | G06F 3/0658 |
| 2019/0296774 A1* | 9/2019 | Uchikawa | H03M 13/2906 |

* cited by examiner

FIG. 3A
| PAM4 SYMBOL | Linear Mapping | Gray Mapping |
|---|---|---|
| +3 | 11 | 11 |
| +1 | 10 | 10 |
| −1 | 01 | 00 |
| −3 | 00 | 01 |
MSB LSB   MSB LSB
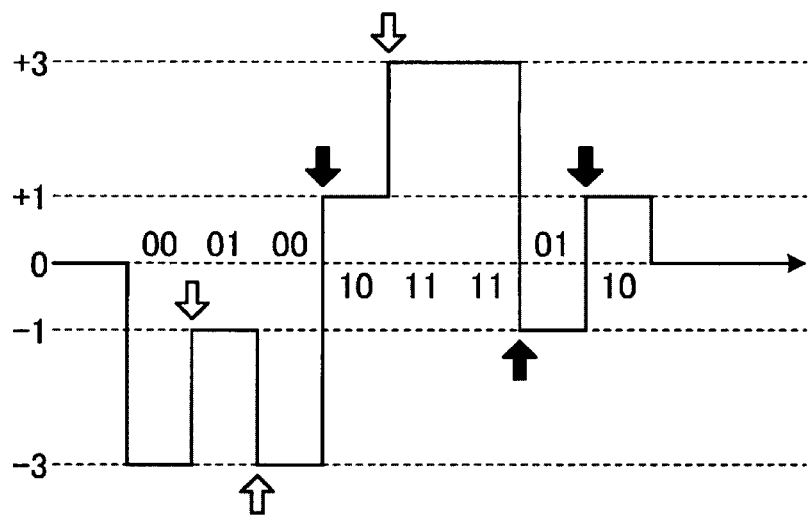
FIG. 3B
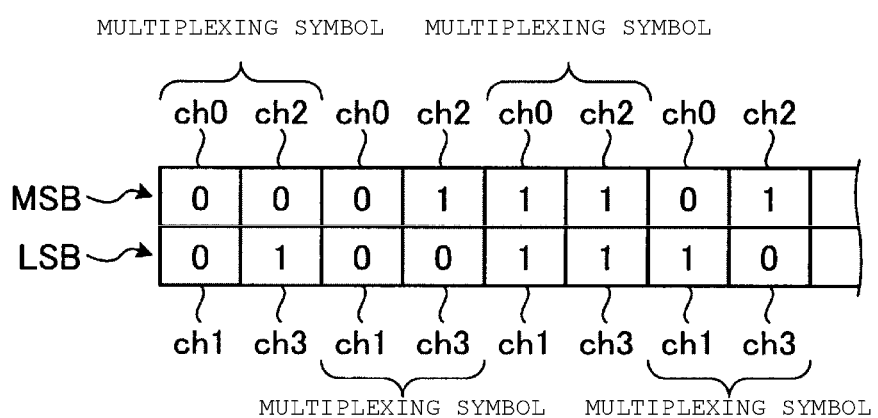
FIG. 3C

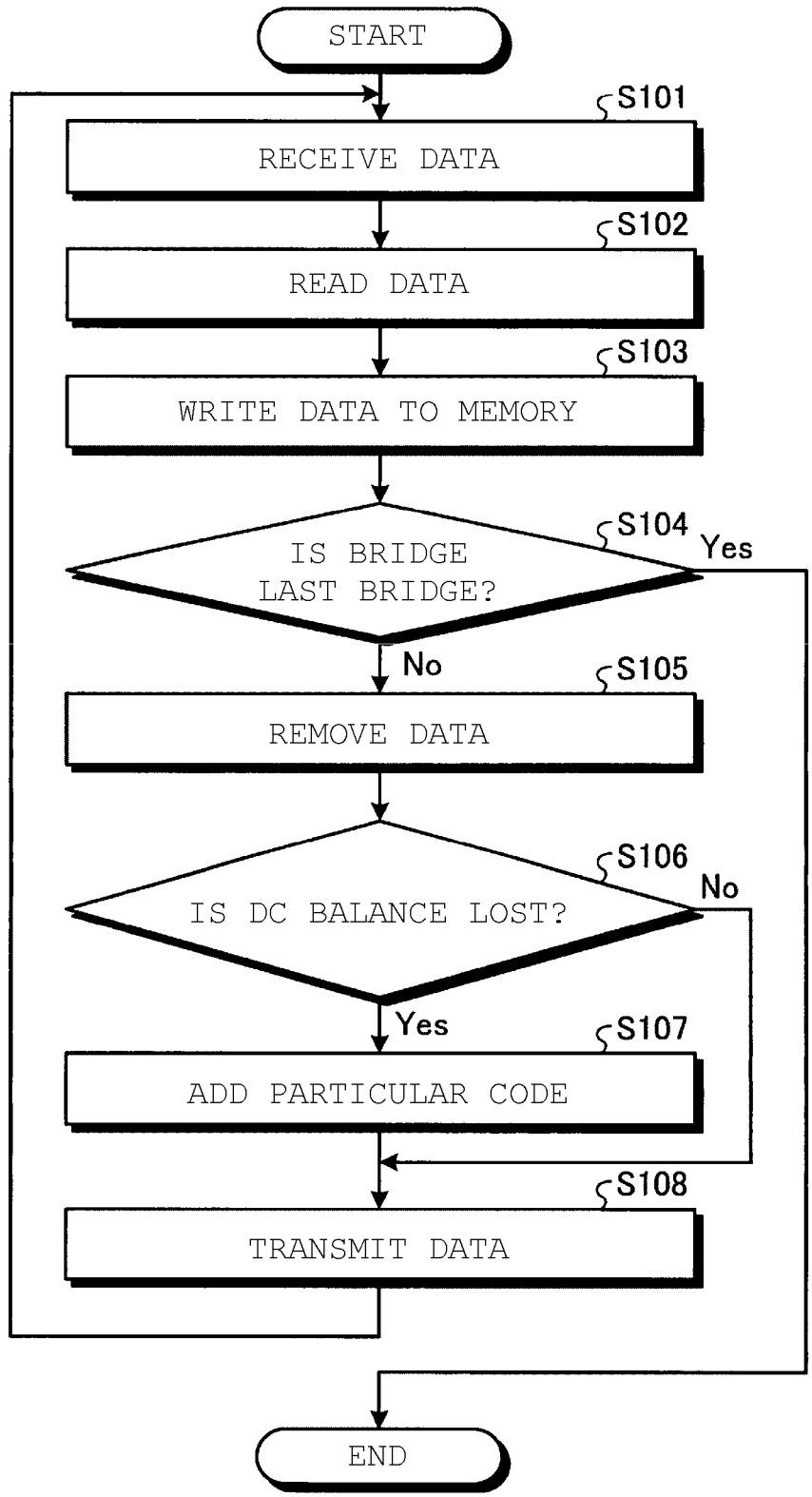

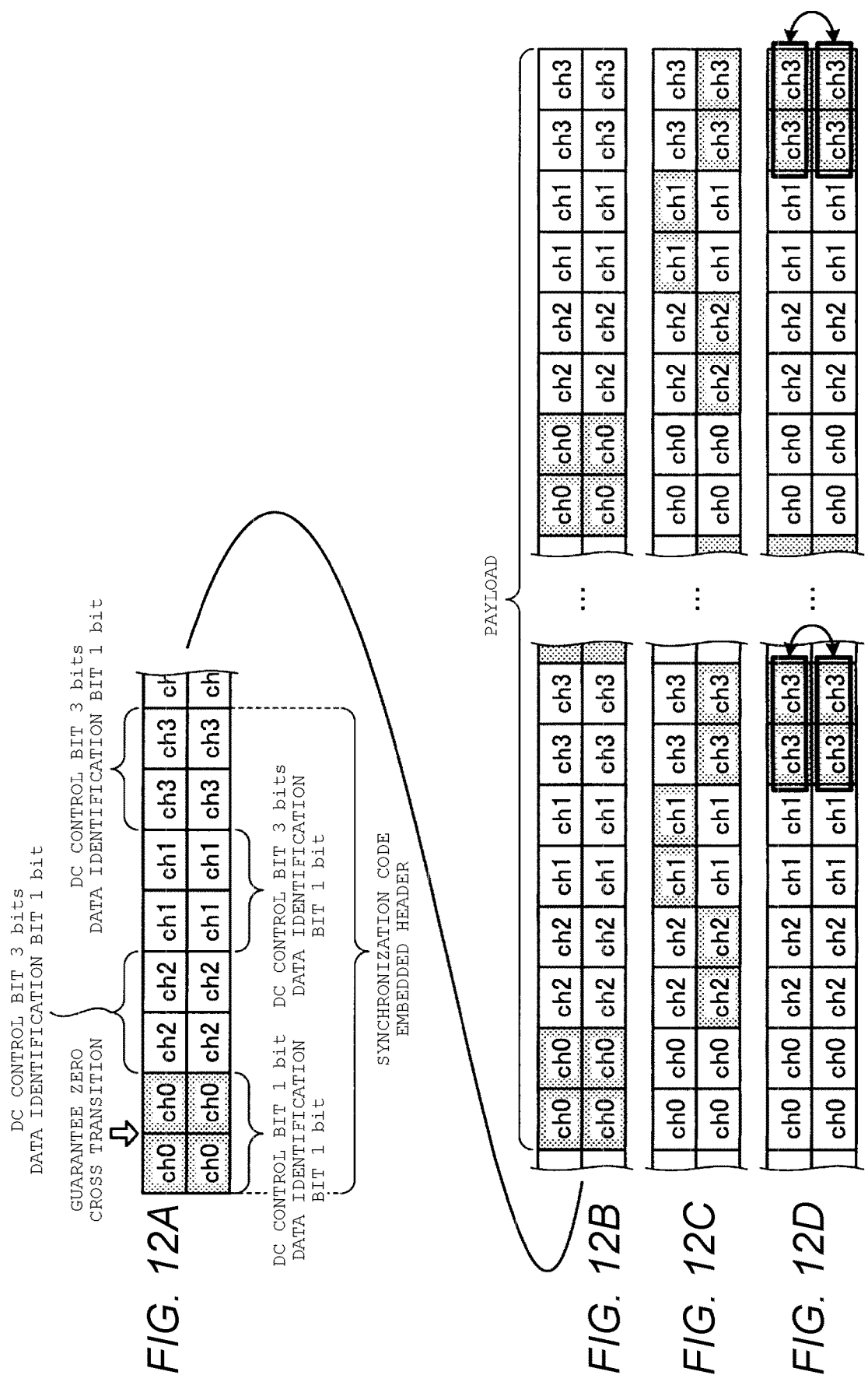

FIG. 13A

AFTER ch3 DATA REMOVAL/
SYNCHRONIZATION CODE
ADDITION

| ch0 | ch0 | ch1 | ch1 | ch2 | ch2 | SYNCHRONIZATION CODE | ch |
|-----|-----|-----|-----|-----|-----|----------------------|----|
| ch0 | ch0 | ch1 | ch1 | ch2 | ch2 | | ch |

FIG. 13B

AFTER ch2 DATA REMOVAL

| ch0 | ch0 | ch1 | ch1 | | SYNCHRONIZATION CODE | ch |
|-----|-----|-----|-----|---|----------------------|----|
| ch0 | ch0 | ch1 | ch1 | | | ch |

FIG. 13C

SYNCHRONIZATION CODE
ADDITION

| ch0 | ch0 | ch1 | ch1 | SYNCHRONIZATION CODE | SYNCHRONIZATION CODE | ch |
|-----|-----|-----|-----|----------------------|----------------------|----|
| ch0 | ch0 | ch1 | ch1 | | | ch |

FIG. 14A
AFTER ch3 DATA REMOVAL/
SYNCHRONIZATION CODE
ADDITION
| ch0 | ch0 | ch2 | ch2 | ch1 | ch1 | SYNCHRONIZATION CODE | ch |
|---|---|---|---|---|---|---|---|
| ch0 | ch0 | ch2 | ch2 | ch1 | ch1 | | ch |
FIG. 14B
AFTER ch2 DATA REMOVAL
| ch0 | ch0 | | | ch1 | ch1 | | ch |
|---|---|---|---|---|---|---|---|
| ch0 | ch0 | | | ch1 | ch1 | | ch |
FIG. 14C
DURING DATA TRANSITION
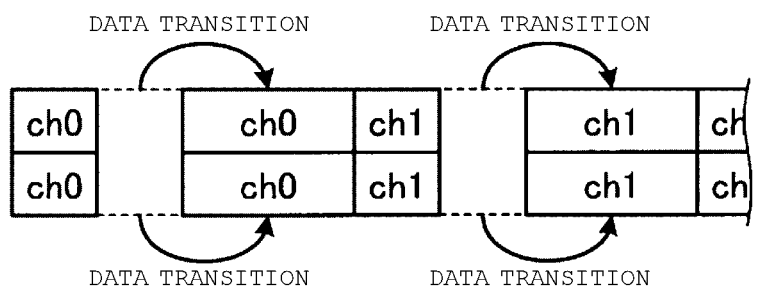
FIG. 14D
AFTER DATA TRANSITION
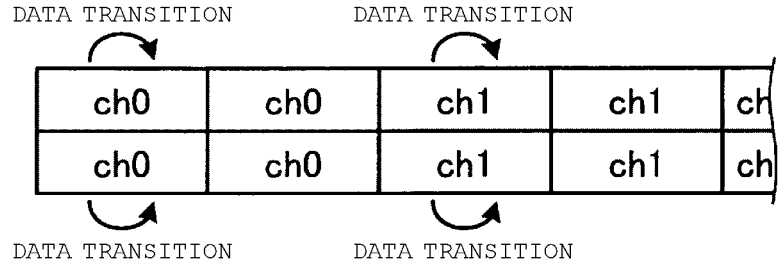

When ch0 DATA(01)
AND ch1 DATA(01)

| Ch0 0 | Ch0 1 | ch2 | ch2 | ch0 | ch0 | ch2 | ch2 | ch |
|---|---|---|---|---|---|---|---|---|
| Ch1 0 | Ch1 1 | ch3 | ch3 | ch1 | ch1 | ch3 | ch3 | ch |

PAM4 SYMBOL    ⇩ −3    ⇩ +3

FIG. 17B

When ch0 DATA(10)
AND ch1 DATA(01)

| Ch0 1 | Ch0 0 | ch2 | ch2 | ch0 | ch0 | ch2 | ch2 | ch |
|---|---|---|---|---|---|---|---|---|
| Ch1 0 | Ch1 1 | ch3 | ch3 | ch1 | ch1 | ch3 | ch3 | ch |

PAM4 SYMBOL    ⇩ +1    ⇩ −1

FIG. 17C

When ch0 DATA(01)
AND ch1 DATA(10)

| Ch0 0 | Ch0 1 | ch2 | ch2 | ch0 | ch0 | ch2 | ch2 | ch |
|---|---|---|---|---|---|---|---|---|
| Ch1 1 | Ch1 0 | ch3 | ch3 | ch1 | ch1 | ch3 | ch3 | ch |

PAM4 SYMBOL    ⇩ −1    ⇩ +1

FIG. 17D

When ch0 DATA(10)
AND ch1 DATA(10)

| Ch0 1 | Ch0 0 | ch2 | ch2 | ch0 | ch0 | ch2 | ch2 | ch |
|---|---|---|---|---|---|---|---|---|
| Ch1 1 | Ch1 0 | ch3 | ch3 | ch1 | ch1 | ch3 | ch3 | ch |

PAM4 SYMBOL    ⇩ +3    ⇩ −3

MEMORY SYSTEM, SEMICONDUCTOR INTEGRATED CIRCUIT, AND METHOD THEREFOR

CROSS-REFERENCE TO RELATED APPLICATION

This application is based upon and claims the benefit of priority from Japanese Patent Application No. 2019-167216, filed Sep. 13, 2019, the entire contents of which are incorporated herein by reference.

FIELD

Embodiments described herein relate generally to a memory system, a semiconductor integrated circuit, and a method therefor.

BACKGROUND

A memory system includes a memory controller and a memory connected to the memory controller. Communication with an external device is performed through a serial interface, and communication with the memory is performed through a memory interface. Generally, since a communication speed of the serial interface is faster than a communication speed of the memory interface, in order to effectively utilize a bandwidth of the serial interface, a plurality of memory interfaces are connected in parallel and an interleaved operation is performed. Meanwhile, if multiple memories are connected in parallel to one memory interface, a load capacity increases and a speed of the memory interface is further reduced. Thus, in order to provide a memory system with a high speed and a large capacity, it is proposed to use a configuration in which multiple parallel memory interfaces each connected to a small number of memories is used. However, the number of the parallel memory interfaces is limited due to the size of a circuit board on which the increased number of wires are disposed. Therefore, a technique for reducing the load capacity and the number of wires using a bridge communication system that performs a serial communication is needed.

DESCRIPTION OF THE DRAWINGS

FIGS. 3A to 3C are diagrams illustrating a PAM4 symbol used by the memory system according to the first embodiment.

FIG. 9 is a flowchart illustrating a write operation sequence in the bridge circuit according to the first embodiment.

FIGS. 12A to 12D are diagrams illustrating a data configuration of a multiplexing symbol used in the memory system according to the second embodiment.

FIGS. 13A to 13C are diagrams illustrating states of data transition of a memory system according to a comparative example.

FIGS. 14A to 14D are diagrams illustrating states of data transition of a memory system according to a modification example.

FIGS. 16A to 16D are diagrams illustrating a data configuration of a multiplexing symbol used in the memory system according to the third embodiment.

FIGS. 17A to 17D are diagrams illustrating a synchronization code embedded headers added to data in the memory system according to the third embodiment.

DETAILED DESCRIPTION

Embodiments employ a pulse amplitude modulation (PAM) method, and provide a memory system, a semiconductor integrated circuit, and a bridge communication system that can perform communication by overlapping data of a plurality of channels with appropriate characteristics.

In general, according to one embodiment, a memory system includes a first nonvolatile memory, a first bridge circuit connected to the memory, a second nonvolatile memory, a second bridge circuit connected to the second memory and connected to the first circuit, and a controller connected to the first circuit and configured to output, to the first circuit, first data to be stored in the first memory and second data to be stored in the second memory, the first and second data being mapped to multiplexing symbols. The first bridge circuit is configured to, upon receipt of the multiplexing symbols, extract the first data from the symbols, store the first data in the first memory, generate third data based on the second data to insert the generated third data into the multiplexing symbols where the first data was mapped, and output to the second circuit the multiplexing symbols into which the third data has been inserted.

Hereinafter, embodiments of the present disclosure will be described in detail with reference to the drawings. The present disclosure is not limited to the following embodiments. Further, configuration elements in the following embodiments include configuration elements that can be easily conceived by those skilled in the art or configuration elements that are substantially the same.

First Embodiment

Hereinafter, a first embodiment will be described in detail with reference to the drawings.
Configuration Example of Memory System
FIG. 1 is a diagram illustrating a configuration of a memory system 1 according to a first embodiment.

The memory system 1 serving as a bridge communication system transmits and receives data to and from a host 2. The host 2 is, for example, a personal computer, a mobile device, or a server. The memory system 1 can receive access requests including a read request and a write request from the host 2. The memory system 1 is, for example, a solid state drive (SSD), a secure digital (SD) memory card drive, or the like. However, the memory system 1 is not limited to these and may be any system that can read and write data from and to a nonvolatile memory.

Figure 1:
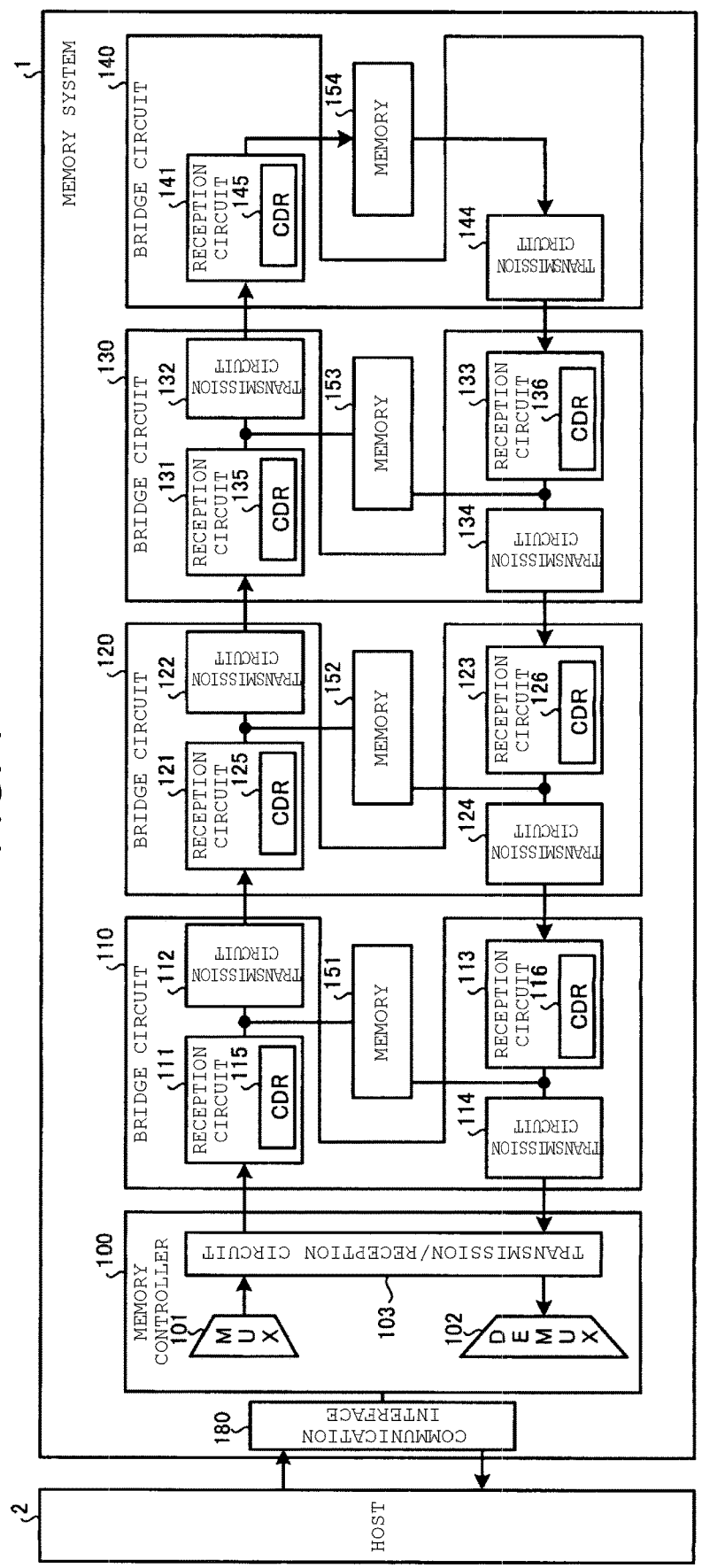
FIG. 1 is a diagram illustrating a configuration of a memory system according to a first embodiment.

As illustrated in FIG. 1, the memory system 1 includes a communication interface 180, a memory controller 100 serving as a semiconductor integrated circuit, bridge circuits 110 to 140, and memories 151 to 154. In an example of FIG. 1, the number of the bridge circuits 110 to 140 and the number of the memories 151 to 154 are four. However, any number of the bridge circuits and the memories may be used as long as both numbers are identical.

The communication interface 180 is an interface circuit that transmits and receives data to and from the host 2.

The memory controller 100 includes a multiplexing unit (MUX) 101, a demultiplexing unit (DEMUX) 102, and a transmission and reception circuit 103, and controls data transmission between the host 2 and the memories 151 to 154. A 4-level pulse amplitude modulation (PAM4) is used for data transmission from the memory controller 100 to the bridge circuits 110 to 140. The PAM4 is a data transmission method having 4-level amplitude information.

The multiplexing unit 101 converts communication data of one bit unit received from the host 2 into a multiplexing symbol in which a plurality of bits are multiplexed. As will be described below, the multiplexing symbol is a data transmission signal obtained by multiplexing a plurality of bits of data in at least one of an amplitude direction and a time direction in data transmission. For example, 1-bit data per one symbol for each of the memories 151 to 154 is assigned to each multiplexing symbol generated by the multiplexing unit 101.

The transmission and reception circuit 103 transmits multiplexing symbols multiplexed by the multiplexing unit 101 to the bridge circuit 110. Further, the transmission and reception circuit 103 receives multiplexing symbols from the bridge circuit 110 and transmits the received multiplexing symbol to the demultiplexer 102.

The demultiplexer 102 receives the multiplexing symbol including data read from each of the memories 151 to 154 from the bridge circuit 110, reads data of one bit unit for each multiplexing symbol, and generates data for each of the memories 151 to 154. The generated data are transmitted to the host 2 via the communication interface 180.

The bridge circuit 110 includes a reception circuit 111, a transmission circuit 112, a reception circuit 113, and a transmission circuit 114 and controls reading and writing of data for the memory 151.

The reception circuit 111 includes a clock data recovery (CDR) circuit 115 and reads 1-bit data for the memory 151 from a multiplexing symbol transmitted from the memory controller 100, writes the read 1-bit data to the memory 151, and transmits a multiplexing symbol to the transmission circuit 112. For example, the CDR circuit 115 reproduces a synchronization signal embedded in data of the transmitted multiplexing symbol. The same applies to CDR circuits 125 to 145 and 116 to 136 which will be described below.

The transmission circuit 112 removes 1-bit data for the memory 151 from the multiplexing symbol transmitted from the reception circuit 111 and transmits a processed multiplexing symbol to the bridge circuit 120. The removal of data from the multiplexing symbol includes invalidating particular data embedded in the multiplexing symbol. Hereinafter, the invalidated bit may be referred to as a blank bit.

The reception circuit 113 includes the CDR circuit 116, receives a multiplexing symbol transmitted from the bridge circuit 120 and transmits a multiplexing symbol to the transmission circuit 114.

When the memory 151 is a read target, the transmission circuit 114 reads 1-bit data from the memory 151, assigns the 1-bit data read from the memory 151 to the multiplexing symbol transmitted from the reception circuit 113, and transmits a multiplexing symbol to the memory controller 100. When the memory 151 is not the read target, the transmission circuit 114 transmits the multiplexing symbol transmitted from the reception circuit 113 to the memory controller 100 without reading data from the memory 151.

Hereinafter, the bridge circuits 120 to 140 also have substantially the same configuration as the bridge circuit 110. However, as shown in FIG. 1, the bridge circuit 140 may only have one reception circuit 141 and one transmission circuit 144.

The reception circuits 121 to 141 of the bridge circuits 120 to 140 include the CDR circuits 125 to 145, respectively. When there are data to be written to the corresponding memory in a multiplexing symbol transmitted from the upstream bridge circuit (i.e., a bridge circuit on the host 2 side), each of the reception circuits 121 to 141 reads corresponding 1-bit data from the multiplexing symbol to write to the corresponding memory. The reception circuits 121 and 131 transmit a multiplexing symbol to the transmission circuits 122 and 132, respectively.

When writing the corresponding 1-bit data to the corresponding memory, the transmission circuits 122 and 132 of the bridge circuits 120 and 130 remove the corresponding 1-bit data from the multiplexing symbols transmitted from the reception circuits 121 and 131, and transmit a multiplexing symbol to the downstream bridge circuit (i.e., abridge circuit on a side far from the host 2).

The reception circuits 123 and 133 of the bridge circuits 120 and 130 include the CDR circuits 126 and 136, respectively, and receive the multiplexing symbols transmitted from the downstream bridge circuit and transmit a multiplexing symbol to the transmission circuits 124 and 134.

Each of the transmission circuits 124 to 144 of the bridge circuit 120 to 140 reads 1-bit data from the corresponding memory, generates a multiplexing symbol to which the 1-bit data read from the memory 154 is assigned, or assigns the 1-bit data read from the corresponding memory to the multiplexing symbols transmitted from the reception circuits 123 and 133, and transmits a multiplexing symbol to the upstream bridge circuit.

Each of the memories 151 to 154 is, for example, a NAND flash memory sealed in one package. However, each of the memories 151 to 154 is not limited to the NAND flash memory sealed in one package, and may be configured with a plurality of memories such as a memory group connected in parallel via a memory interface and a memory chip group stacked in one package. Further, a NOR flash memory may be used instead of the NAND flash memory.

Configuration Example of Memory Controller

Figure 2:
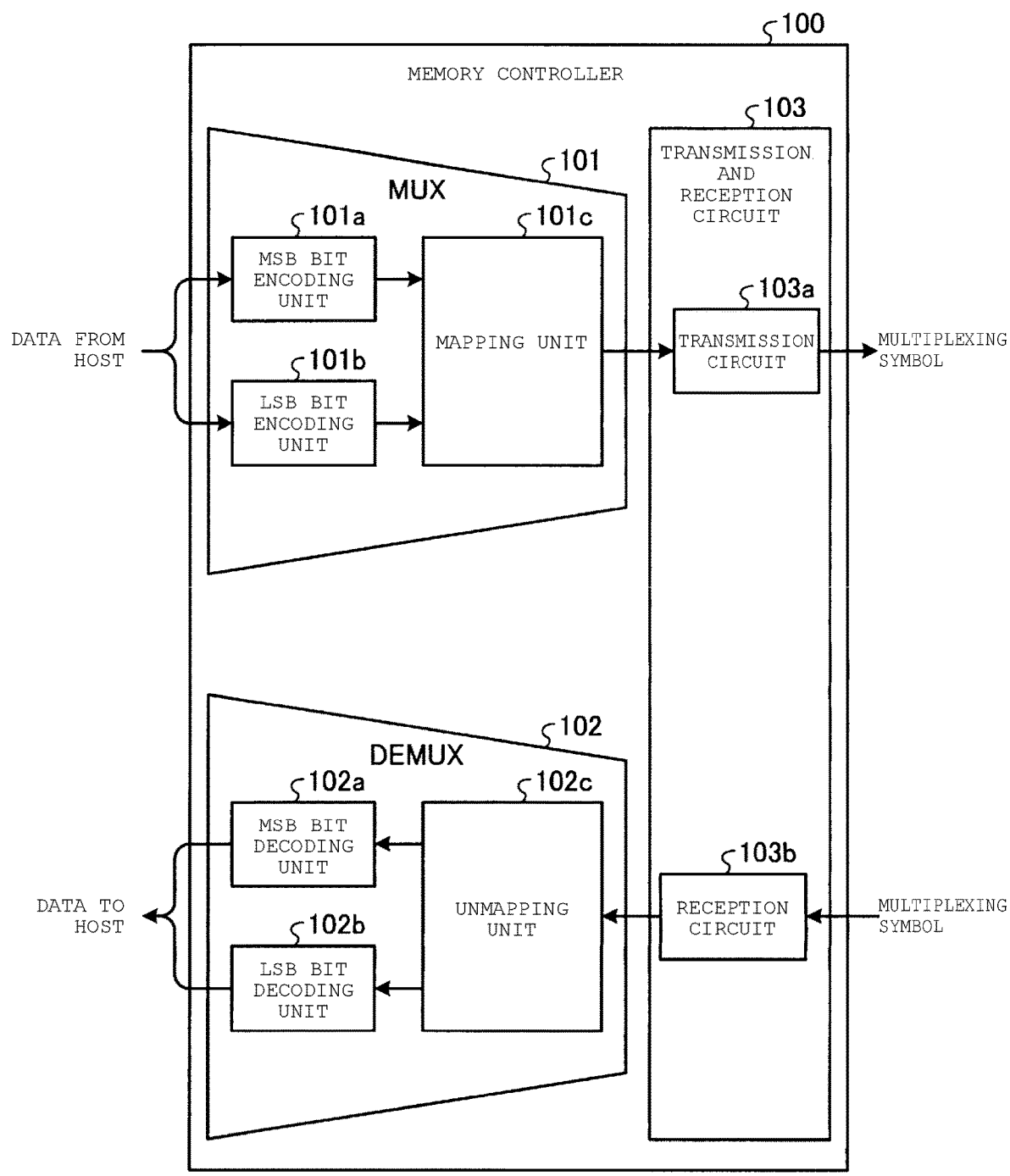
FIG. 2 is a diagram illustrating a configuration of a memory controller according to the first embodiment.

Next, a more detailed configuration of the memory controller 100 according to the first embodiment will be described with reference to FIGS. 2 and 3. FIG. 2 is a diagram illustrating the configuration of the memory controller 100 according to the first embodiment.

As illustrated in FIG. 2, the multiplexing unit (MUX) 101 of the memory controller 100 includes a most significant bit (MSB) bit encoding unit 101a, a least significant bit (LSB) bit encoding unit 101b, and a mapping unit 101c.

The MSB bit encoding unit 101a encodes predetermined bits of data transmitted from the host 2 via the communication interface 180 as an MSB bit data string. The LSB bit encoding unit 101b encodes the other bits of the data transmitted from the host 2 via the communication interface 180 as an LSB bit data string.

At this time, the MSB bit encoding unit 101a and the LSB bit encoding unit 101b perform an encoding process such that a DC balance is guaranteed independently for each of the MSB bit data string and the LSB bit data string. "DC balance is guaranteed" refers to a state where data are balanced without being biased to "0" or "1".

By guaranteeing the DC balance of the data, for example, even if an analog circuit configured to perform a method of not passing a DC component such as capacitive coupling is inserted into a transmission path in the memory system 1, it is possible to prevent a shift of a zero value, that is, a shift of an average level of a signal.

An encoding process of guaranteeing the DC balance may be performed by using a modulation method such as an 8B10B method or a 64B66B method. By using the method, it is also guaranteed that a data transition in which a data value changes occurs within a predetermined period.

The mapping unit 101c converts the MSB bit data string encoded by the MSB bit encoding unit 101a and the LSB bit data string encoded by the LSB bit encoding unit 101b into a multiplexing symbol including 4-bit data as described above by mapping with a PAM4 symbol of a 4-level. The PAM4 symbol is used when the PAM4 is adopted as a data transmission method and is a data transmission signal in which one symbol is including 2-bit data. That is, in the present technology, a signal using the PAM4 symbol is adopted as the data transmission method, and the PAM4 symbol is multiplexed.

In the present example, it is premised that a linear mapping method is used as the mapping or assignment method. In the linear mapping, the MSB bit and the LSB bit are encoded independently such that the numbers of "0" and "1" are equal. This is an indispensable condition for guaranteeing the above-described DC balance.

The transmission and reception circuit 103 of the memory controller 100 includes a transmission circuit 103a and a reception circuit 103b. The transmission circuit 103a transmits, to the bridge circuit 110, data converted to a multiplexing symbol and in which the DC balance and data transition are guaranteed. The reception circuit 103b receives from the bridge circuit 110 the data of the memories 151 to 154 assigned to the multiplexing symbols by the bridge circuits 110 to 140.

An unmapping unit 102c demodulates the multiplexing symbol transmitted from the bridge circuit 110 into an MSB bit data string and an LSB bit data string.

An MSB bit decoding unit 102a decodes the MSB bit data string from the unmapping unit 102c. An LSB bit decoding unit 102b decodes the LSB bit data string from the unmapping unit 102c.

The decoded MSB bit data string and the decoded LSB bit data string are transmitted from the memory controller 100 to the host 2 via the communication interface 180.

FIGS. 3A to 3B are diagrams illustrating a configuration of the PAM4 symbol used in the memory system 1 according to the first embodiment.

In the PAM4, binary data can be transmitted in one unit interval (UI). More specifically, in the PAM4, 2-bit data of an MSB bit and an LSB bit is transmitted in one UI. Then, the 2-bit data of the MSB bit and the LSB bit transmitted in two UIs is assigned to two PAM4 symbols that can take four levels.

As illustrated in FIG. 3A, there are two types of linear mapping and gray mapping in a data assigning method of the PAM4. In each of the linear mapping and the gray mapping, 2-bit data consisting of the MSB bit and the LSB bit (11), (10), (01), and (00) are assigned or mapped to PAM4 symbols of four level and "−3". The mapping unit 101c and the unmapping unit 102c of the memory controller 100 operate on the premise of the linear mapping.

A PAM4 waveform illustrated in FIG. 3B is generated by assigning a certain data string (00) (10) (00) (10) (11) (11) (01) (10) to the PAM 4 symbol using the linear mapping. As illustrated in FIG. 3B, in the present example, it is presumed that the PAM4 waveform includes non-return to zero (NRZ) symbols that do not return to zero between the respective bits.

Here, except the time of transition from the data (11) to the data (11), a data transition occurs in which a level of the PAM4 symbol changes as indicated by an arrow. As indicated by a black arrow, the data transition particularly across a level 0 among the data transitions is sometimes referred to as a zero crossing transition. By configuring the PAM4 waveform with the above NRZ symbol, the zero crossing transition can occur.

Further, a predetermined number (for example, 2) of the PAM4 symbols that are continuous becomes the multiplexing symbols that are multiplexed data.

Figure 4:
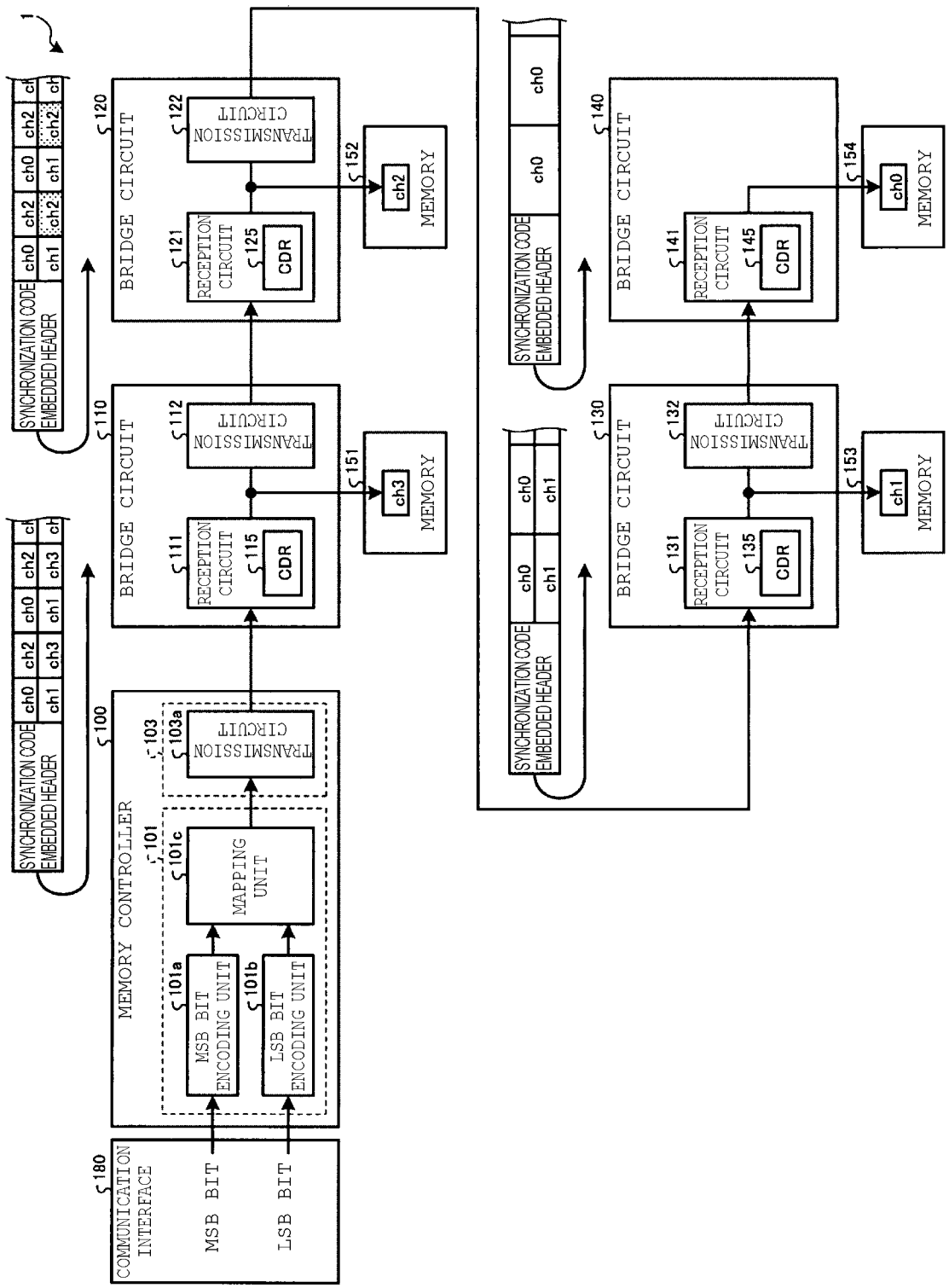
FIG. 4 is a diagram illustrating a write operation performed by the memory system according to the first embodiment.

In the example illustrated in FIG. 3C, 4-bit data corresponding to two PAM4 symbols, that is, data of channels ch0 to ch3 each including one MSB bit or one LSB bit are collectively multiplexed. The channels ch0 to ch3 make up a multiplexing symbol having two bits in an amplitude direction and two bits in a time direction per symbol. The channels ch0 to ch3 are assigned to the memories 151 to 154, respectively. Hereinafter, data of the channels ch0 to ch3 may be simply referred to as channels ch0 to ch3.

Specifically, the channel ch0 is assigned as a data region of the memory 154. 1-bit data to be written to the memory 154 or 1-bit data read from the memory 154 is embedded in the channel ch0.

The channel ch1 is assigned as a data region of the memory 153. 1-bit data to be written to the memory 153 or 1-bit data read from the memory 153 is embedded in the channel ch1.

The channel ch2 is assigned as a data region of the memory 152. 1-bit data to be written to the memory 152 or 1-bit data read from the memory 152 is embedded in the channel ch2.

The channel ch3 is assigned as a data region of the memory 151. 1-bit data to be written to the memory 151 or 1-bit data read from the memory 151 is embedded in the channel ch3.

At the time of encoding for guaranteeing the DC balance and the data transition, the MSB bit encoding unit 101a and the LSB bit encoding unit 101b perform encoding by scrambling for each channel ch0 to ch3, that is, for each data for the memories 151 to 154, so as to guarantee the DC balance and data transition.

The above-described assignment of the channels ch0 to ch3 to the memories 151 to 154 is performed, for example, as follows. When the memory system 1 is booted, the memory controller 100 transmits an ID uniquely identified for each of the bridge circuits 110 to 140 to the bridge circuits 110 to 140. The bridge circuits 110 to 140 can identify channels assigned thereto according to the transmitted IDs. At the time of data communication, data can be exchanged between the memory controller 100 and the memories 151 to 154 by using the channel assigned previously at the time of booting. However, the assignment of the channels ch0 to ch3 may be set when the memory system 1 is shipped.

Write Operation Example of Memory System

Next, a write operation performed in the memory system 1 according to the first embodiment will be described in detail with reference to FIG. 4. FIG. 4 is a diagram illustrating the write operation performed by the memory system 1 according to the first embodiment.

As illustrated in FIG. 4, the memory controller 100 acquires an MSB bit data string and an LSB bit data string to be written to the memories 151 to 154 via the communication interface 180 from the host 2.

The MSB bit encoding unit 101a encodes the MSB bit data string by the encoding process of guaranteeing the DC balance and data transition. The LSB bit encoding unit 101b encodes the LSB bit data string by the encoding process of guaranteeing the DC balance and data transition.

Further, the MSB bit encoding unit 101a and the LSB bit encoding unit 101b add header information (i.e., PHY header) which is information for identifying beginning of a data string in a physical layer (PHY) to the beginning of the multiplexing symbol data. The PHY header is a synchronization code embedded header in which a code becoming a synchronization signal (i.e., clock) is embedded in various types of information included in the PHY header. The synchronization code embedded header will be described below.

The mapping unit 101c maps 1-bit data in the MSB bit data sequence from the MSB bit encoding unit 101a and 1-bit data in the LSB bit data sequence from the LSB bit encoding unit 101b onto the PAM4 symbol by linear mapping and converts each of the 1-bit data into a multiplexing symbol including 4-bit data.

The transmission circuit 103a transmits such data to the bridge circuit 110. As described above, such data has a configuration of a 4-channel multiplexing symbol in which 1-bit data for the memories 151 to 154 is embedded in one symbol of the multiplexing symbol.

A correspondence relationship between the channels ch0 to ch3 included in the multiplexing symbol has been transmitted from the memory controller 100 to the bridge circuits 110 to 140 in advance. Thereby, the bridge circuits 110 to 140 can take out data for the memories 151 to 154 connected thereto from any of the channels ch0 to ch3.

The CDR circuit 115 in the reception circuit 111 of the bridge circuit 110 is phase-synchronized with a synchronization signal embedded in data from the memory controller 100. The reception circuit 111 reads 1-bit data of the channel ch3 that is data for the memory 151 from the multiplexing symbol transmitted from the memory controller 100 in response to the synchronization signal, and writes the data to the memory 151. The reception circuit 111 transmits the multiplexing symbol and the synchronization signal to the transmission circuit 112.

The transmission circuit 112 of the bridge circuit 110 removes 1-bit data of the channel ch3, which is data for the memory 151, from the multiplexing symbol transmitted from the reception circuit 111 in response to the synchronization signal.

At this time, a data length of the LSB bit from which the data for the memory 151 is removed becomes shorter than an original data length by a process of the bridge circuit 110. That is, one bit of channel ch3 from which the data for memory 151 is removed becomes invalid. In such a state, a DC balance of the data may be lost.

Therefore, the transmission circuit 112 inserts a particular code into each multiplexing symbol from which the 1-bit data for the memory 151 is removed, fills the invalid portion, and makes the data length uniform. The particular code is data other than the removed 1-bit data for the memory 151, for example, data of the MSB bit at a location corresponding to the LSB bit from which the data for the memory 151 is removed, or inverted data thereof (hereinafter also simply referred to as "inverted data") is copied. The LSB bit from which the data for memory 151 is removed is data of the channel ch3, and the MSB bit at a location corresponding to the channel ch3 is data of the channel ch2.

Whether the particular code to be inserted into the channel ch3 is the data of the channel ch2 or inverted data thereof is selected based on, for example, the preceding and subsequent multiplexing symbols. Thereby, for example, a DC balance and a data transition of all the data can be easily guaranteed.

The transmission circuit 112 transmits data into which the particular code is inserted to the bridge circuit 120. The data at this time has a three-channel multiplexing symbol in which 1-bit data for each of the memories 152 to 154 is embedded in one symbol of the multiplexing symbol.

The reception circuit 121 of the bridge circuit 120 reads 1-bit data of the channel ch2, which is data for the memory 152, from the multiplexing symbol transmitted from the bridge circuit 110, and writes the data to the memory 152, in the same manner as the reception circuit 111 described above.

In the transmission circuit 122 of the bridge circuit 120, 1-bit data of the channel ch2 that is data for the memory 152 is removed from the multiplexing symbol transmitted from the reception circuit 121, and a data length of the MSB bit becomes shorter than the original data length, in the same manner as the transmission circuit 112 described above.

Further, the data of channel ch3 parallel with the channel ch2 in an amplitude direction within one symbol of the multiplexing symbol is simply data inserted to achieve a DC balance and is not data to be transmitted. Thus, two bits of the channels ch2 and ch3 parallel with each other in the amplitude direction within one symbol of the multiplexing symbol are substantially invalid data.

Accordingly, the data transmitted as one symbol of the multiplexing symbol is only 2-bit data of the channels ch0 and ch1. In other words, the data of the channels ch0 and ch1 parallel with each other in the amplitude direction extend in the time direction, and the invalid portions of the removed channels ch2 and ch3 are filled.

The transmission circuit 122 transmits the data in which the invalid portion is filled with the data of the channels ch0 and ch1 to the bridge circuit 130. The data at this time has a 2-channel multiplexing symbol in which 1-bit data for each of the memories 153 and 154 is embedded in one symbol of the multiplexing symbol.

The reception circuit 131 of the bridge circuit 130 reads 1-bit data of the channel ch1, which is data for the memory 153, from the multiplexing symbol transmitted from the bridge circuit 120, and writes the data to the memory 153, in the same manner as the reception circuits 111 and 121 described above.

In the transmission circuit 132 of the bridge circuit 130, the 1-bit data of the channel ch1, which is the data for the memory 153, is removed from the multiplexing symbol transmitted from the reception circuit 131 in the same manner as the transmission circuits 112 and 122 described above, and one bit of channel ch1 parallel with the channel ch0 in the amplitude direction is invalidated within one symbol of the multiplexing symbol. Accordingly, the data of the channel ch0 extends in the amplitude direction, and the removed invalid portion of the channel ch1 is filled.

The transmission circuit 132 transmits the data in which the invalid portion is filled with the data of the channel ch0 to the bridge circuit 140. The data at this time has a 1-channel multiplexing symbol in which 1-bit data for the memory 154 is embedded in one symbol of the multiplexing symbol.

The reception circuit 141 of the bridge circuit 140 reads 1-bit data of the channel ch0 that is data for the memory 154 from the multiplexing symbol transmitted from the bridge circuit 130, and writes the data to the memory 154 in the same manner as the reception circuits 111 to 131 described above.

As described above, the MSB bit data string and the LSB bit data string from the host 2 are written to the memories 151 to 154.

Configuration Example of Synchronization code Embedded Header

In a transmission method using the PAM4 or the like, a synchronization signal is embedded in data and transmitted. The synchronization signal includes a synchronization code including, for example, a zero crossing transition in which a data transitions across a level 0 of amplitude of the PAM4 symbol. Here, as described above, the zero crossing transition is based on the premise that the PAM 4 waveform includes the NRZ symbol. As the zero crossing transition occurs within a predetermined period, the CDR circuits 115 to 145 of the bridge circuits 110 to 140 can identify the PAM4 symbol before and after the zero crossing transition, identify edge timing of the PAM4 symbols, and synchronize a phase with data including the synchronization signal by the synchronization code. Timing at which the zero crossing transition occurs may be a period that is sufficiently short to achieve synchronization and may not be a constant period.

As described above, the data transmitted from the memory controller 100 to the bridge circuits 110 to 140 is data which are guaranteed in a DC balance and a data transition. However, the guarantee of data transition here does not mean that the zero crossing transition necessarily occur. Therefore, as the data has redundancy, a synchronization code that guarantees the zero crossing transition is embedded in the PHY header.

Hereinafter, a configuration of a synchronization code embedded header which is added to data and indicates a PHY header in the memory system 1 according to the first embodiment will be described with reference to FIGS. 5A to 6B.

FIGS. 5A to 6B are diagrams illustrating a configuration of the synchronization code embedded header added to data in the memory system 1 according to the first embodiment. A symbol "~" in the figures indicates NOT of a logical expression (i.e., logical negation), and a symbol "^" indicates XOR (exclusive OR) of the logical expression. Data A to D indicate predetermined information to be transmitted in the PHY header, and each represents 1-bit data of "0" or "1". The predetermined information to be transmitted by the PHY header includes, for example, information about a physical configuration of the memory system 1.

When generating a synchronization code embedded header in which a synchronization code is embedded, an encoding process with the guaranteed DC balance and data transition of an 8B10B method, a 64B66B method, or the like is used. A plurality of different patterns can be used for a configuration of the synchronization code embedded header generated in this way. Here, some patterns are illustrated.

Figure 5A:
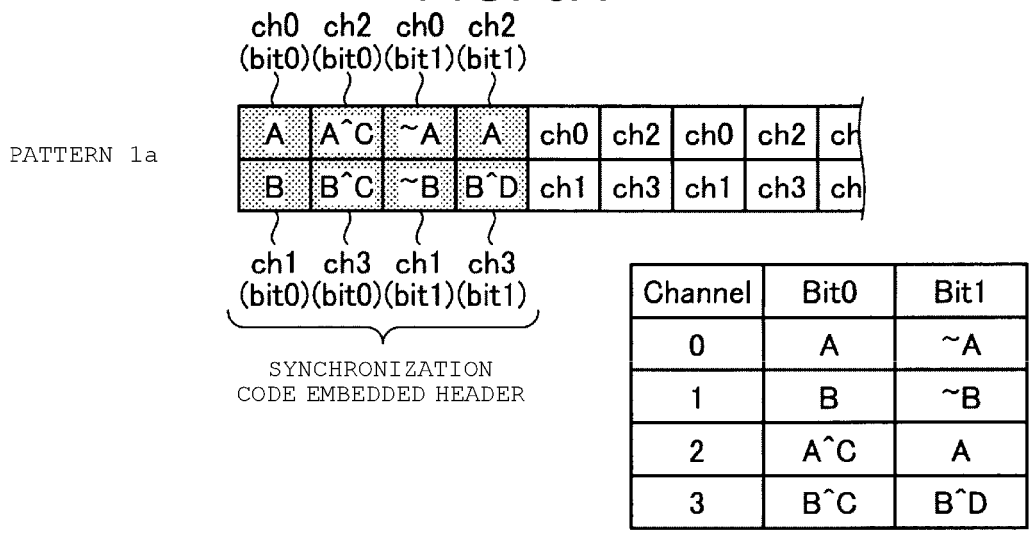
FIGS. 5A to 5C are diagrams illustrating a synchronization code embedded headers added to data in the memory system according to the first embodiment.
Figure 5B:
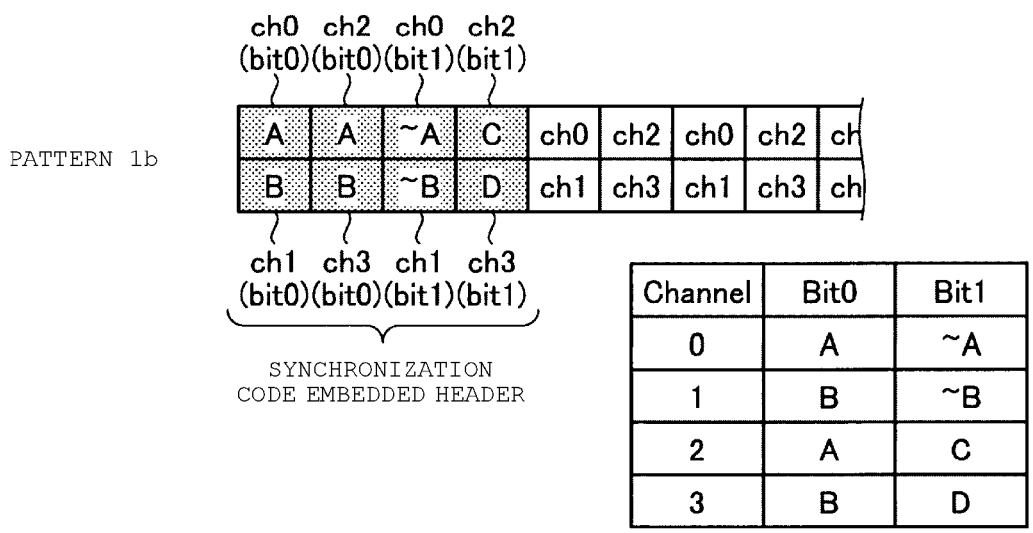
Figure 5C:
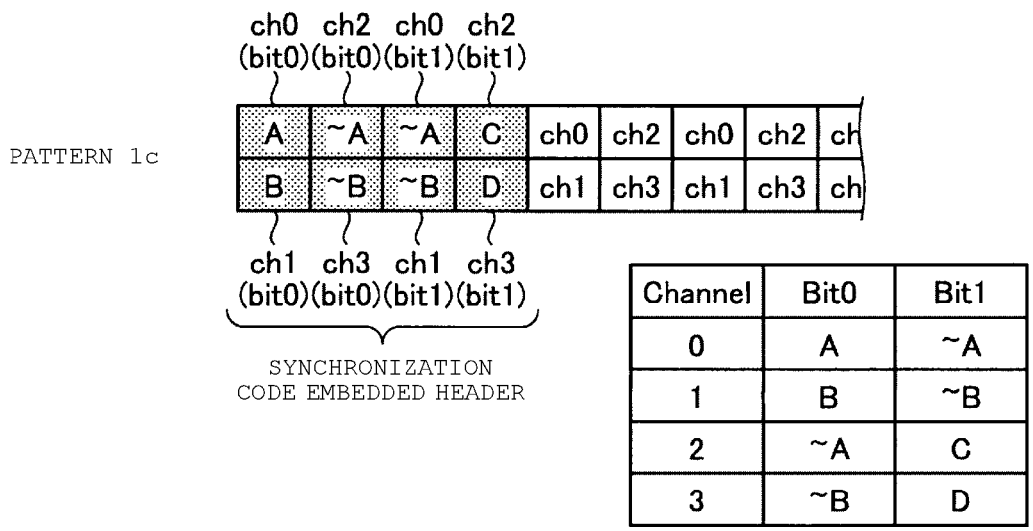

In patterns 1a to 1c illustrated in FIGS. 5A to 5C, eight bits, that is, two multiplexing symbols are used for transmission of data A to D of four bits to be transmitted by the PHY header. In other words, in the patterns 1a to 1c, 1-bit information is disposed in each of the channels ch0 to ch3 in the two multiplexing symbols that are synchronization codes, and thereby, while the 1-bit information of each of the channels ch0 to ch3 is transmitted, a zero crossing transition is guaranteed.

For example, in the example illustrated in FIG. 5A, data A is disposed in a first bit (bit 0) of the channel ch0, that is, the channel ch0 included in a first symbol of the multiplexing symbol. Data ~A is disposed in a second bit (bit 1) of the channel ch0, that is, the channel ch0 included in a second symbol of the multiplexing symbol. Thereby, the channel ch0 transmits the data A as predetermined information.

Likewise, the channel ch1 transmits data B as the predetermined information by 2 bits of the channel ch1 included in each multiplexing symbol.

Data C is transmitted as the predetermined information by two bits of the channel ch2. That is, based on four combinations of $A\textasciicircum C=0\textasciicircum 0=0$, $A\textasciicircum C=0\textasciicircum 1=1$, $A\textasciicircum C=1\textasciicircum 0=1$, $A\textasciicircum C=1\textasciicircum 1=0$, and channel ch2, data of two bits of the channel ch2 can be generated and data C can be reproduced.

Further, the channel ch3 transmits data D as the predetermined information by two bits of the channel ch3. That is, based on $B\textasciicircum C=0\textasciicircum 0$, $B\textasciicircum C=0\textasciicircum 1=1$, $B\textasciicircum C=1\textasciicircum 0=1$, $B\textasciicircum C=1\textasciicircum 1=0$, and when $B\textasciicircum C=0\textasciicircum 0$ or $B\textasciicircum C=0\textasciicircum 1$, $B\textasciicircum D=0\textasciicircum 0=0$ or $B\textasciicircum D=0\textasciicircum 1=1$, and when $B\textasciicircum C=1\textasciicircum 0$ or $B\textasciicircum C=1\textasciicircum 1$, $B\textasciicircum D=1\textasciicircum 0=1$ or $B\textasciicircum D=1\textasciicircum 1=0$, 2-bit data of channel ch3 can be generated and data D can be reproduced.

Hereinafter, also in the patterns 1b and 1c illustrated in FIGS. 5B and 5C, the same data of the data A to D are transmitted by the channels ch0 to ch3. However, in FIGS. 5B and 5C, different algorithms are used for generating 2-bit data of each of the channels ch2 and ch3 and for reproducing data C and D, respectively.

Further, in the patterns 1a to 1c illustrated in FIGS. 5A to 5C, even if the data A to D are any combination of "0" or "1", it is guaranteed that a zero crossing transition always occurs somewhere in two symbols of the multiplexing symbol included in the synchronization code embedded header.

Furthermore, in the patterns 1a to 1c illustrated in FIGS. 5A to 5C, even if the data of the channels ch3, ch2, and ch1 are sequentially removed by the bridge circuits 112 to 132, data of other channels ch0, ch1, and Ch2 is maintained and the embedded synchronization signal is not lost.

Arrangements of data A to D other than arrangement of the patterns 1a to 1c illustrated in FIGS. 5A and 5C may be used as patterns using two multiplexing symbols for transmission of 4-bit data A to D for the memories 151 to 154.

Figure 6A:
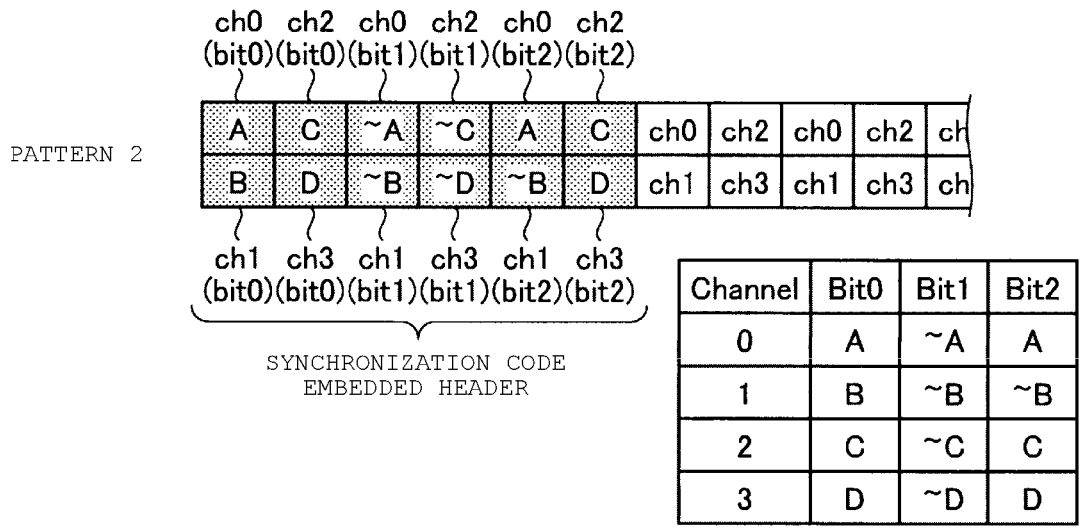
FIGS. 6A and 6B are diagrams illustrating other synchronization code embedded headers added to the data in the memory system according to the first embodiment.

In the pattern 2 illustrated in FIG. 6A, 12 bits, that is, three multiplexing symbols are used to transmit the 4-bit data A to D by the PHY header. In other words, in the pattern 2, 1-bit information is disposed in each of the channels ch0 to ch3 in the three multiplexing symbols which are a synchronization code, and thus a zero crossing transition is guaranteed while transmitting the 1-bit information of each of the channels ch0 to ch3.

In the example illustrated in FIG. 6A, the channel ch0 transmits the data A as data including predetermined information by three bits of the channel ch0. Further, the channel ch1 transmits the data B as the data including the predetermined information by three bits of the channel ch1. Further, the channel ch2 transmits the data C as the data including the predetermined information by three bits of the channel ch2. Further, the channel ch3 transmits the data D as the data including the predetermined information by three bits of the channel ch3.

Further, in the pattern 2, even in any combination of the data A to D is "0" or "1", the zero crossing transition necessarily occurs somewhere in the three symbols of the multiplexing symbol included in the synchronization code embedded header.

Furthermore, in the pattern 2, even if the data of the channels ch3, ch2, and ch1 are sequentially removed by the bridge circuits 112 to 132, data of other channels ch0, ch1, and ch2 are maintained and the embedded synchronization signal is not lost.

As in the pattern 2, by transmitting 4-bit data A to D using the multiplexing symbol including three symbols, independent encoding for each of the channels ch0 to ch3 can be performed. That is, data of the channels ch2 and ch3 can be generated and taken out without knowing data of the channels ch0 and ch1.

The data A to D may be arranged differently from the arrangement illustrated in FIG. 6A described above as a method of the pattern 2 that uses the multiplexing symbol including three symbols for transmission of the 4-bit data A to D by the PHY header.

Figure 6B:
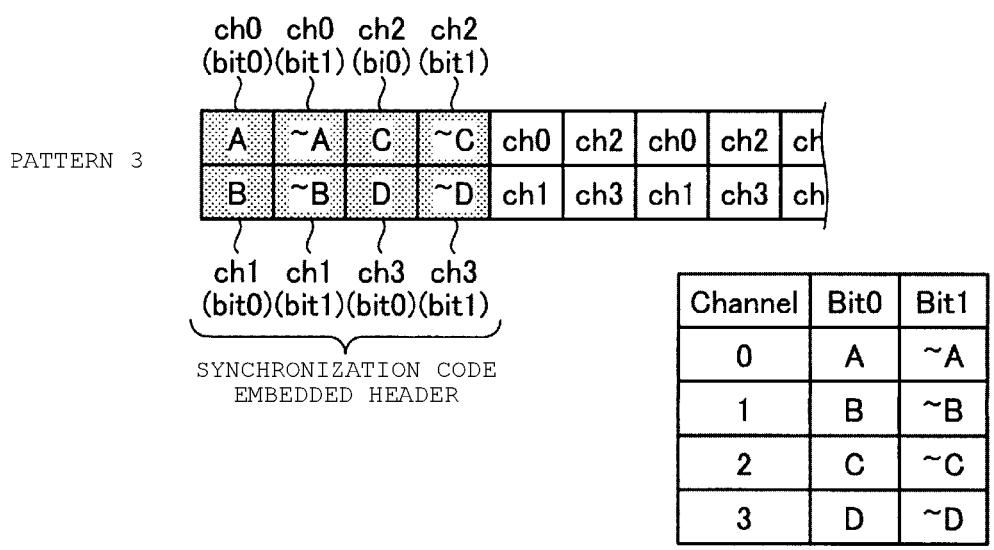

In the pattern 3 illustrated in FIG. 6B, eight bits, that is, two multiplexing symbols are used for transmission of the 4-bit data A to D by the PHY header in the same manner as in the patterns 1a to 1c.

However, in the pattern 3, transmission sequences of the channels ch0 to ch3 in the synchronization code embedded header are different from each other. That is, two bits of the channels ch0 and two bits of the channel ch1 are transmitted in the first multiplexing symbol, and two bits of the channel ch2 and two bits of the channel ch3 are transmitted in the second multiplexing symbol.

As such, independent encoding can be performed for each of the channels ch0 to ch3 also by providing a restriction that only the data of two channels are not transmitted in one multiplexing symbol. That is, data of each of the channels ch0 to ch3 can be generated and taken out without knowing the data of each of the channels ch0 to ch3.

In addition to this, also in the pattern 3, the zero crossing transition necessarily occurs somewhere in the two multiplexing symbols included in the synchronization code embedded header, and data of other channels is maintained even if the data are sequentially removed and the embedded synchronization signal is not lost, which are the same as in the patterns 1a to 1c and the pattern 2.

Further, also in the example illustrated in FIG. 6B, which data A to D are transmitted by the channels ch0 to ch3 are the same as the patterns 1a to c and the pattern 2.

Further, as a pattern that uses four multiplexing symbols for transmission of 4-bit data A to D including predetermined information, the data A to D may be arranged differently from the pattern 3 illustrated in FIG. 6B. Further, patterns other than the patterns 1a to 1c, 2, and 3 described above may be used.

Further, the synchronization code embedded header may be added to the beginning of the data transmitted from the memory controller 100 to the bridge circuit 110, or instead of doing so, the synchronization code embedded header may be inserted in the middle of the data string. The header may be inserted in one location or multiple locations.

Read Operation Example of Memory System

Figure 7:
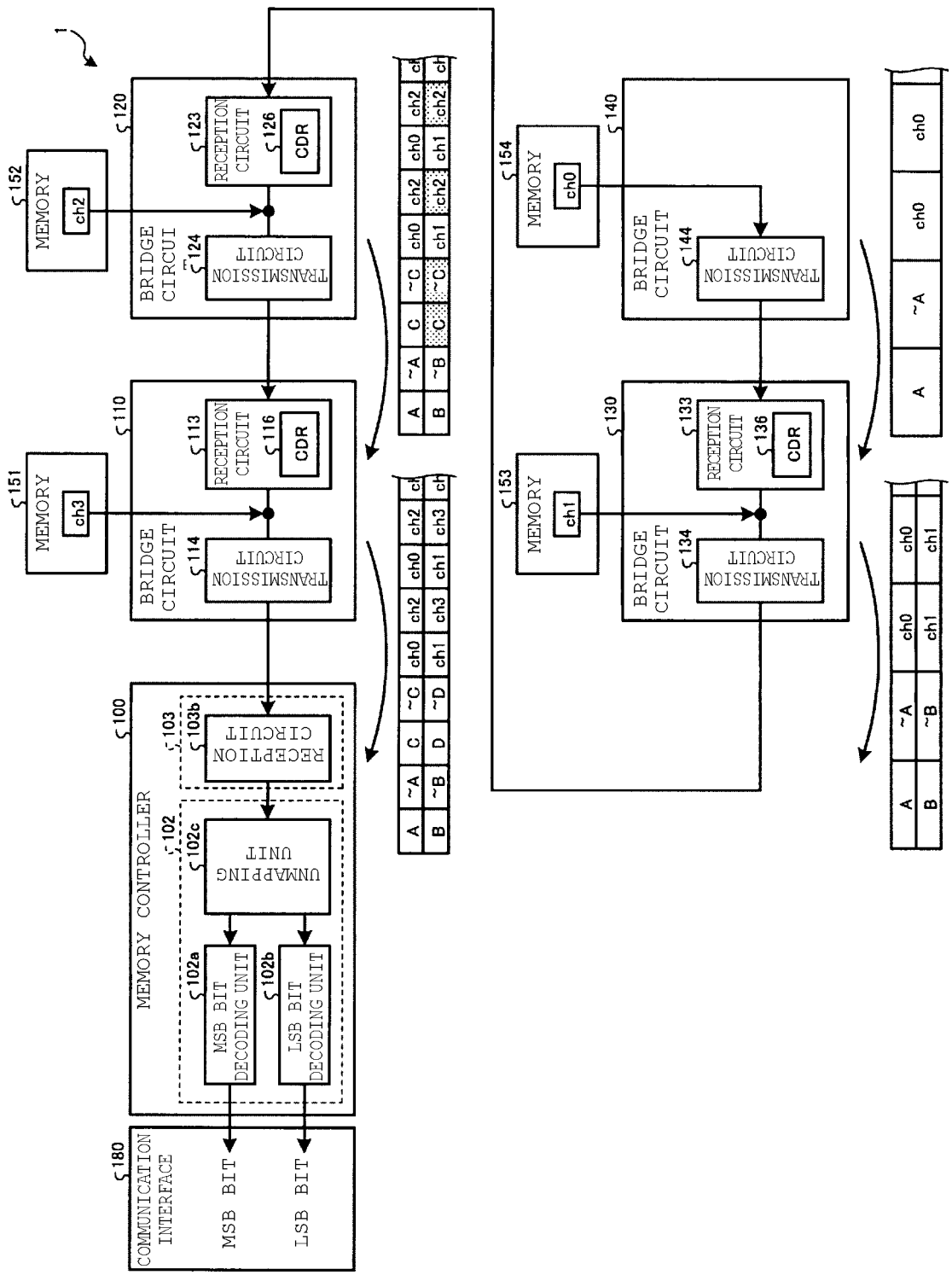
FIG. 7 is a diagram illustrating a read operation of the memory system according to the first embodiment.

Next, a read operation performed by the memory system 1 according to the first embodiment will be described in detail with reference to FIG. 7. FIG. 7 is a diagram illustrating a read operation performed by the memory system 1 according to the first embodiment. Further, FIG. 7 illustrates an example in which the synchronization code embedded header corresponding to the pattern 3 in FIG. 6B is added.

As illustrated in FIG. 7, the transmission circuit 144 of the bridge circuit 140 generates data in which 1-bit data read from the memory 154 is embedded in the channel ch0. At this time, the transmission circuit 144 adds the synchronization code embedded header including a synchronization code and 1-bit data to be transmitted by the PHY header to, for example, the beginning of the data by using two symbols.

The transmission circuit 144 transmits the generated multiplexing symbol data to the bridge circuit 130. The data at this time have multiplexing symbols of one channel in which a synchronization code and 1-bit data to be transmitted by the PHY header are embedded in two multiplexing symbols in the synchronization code embedded header, and 1-bit data from the memory 154 is embedded in one symbol of each multiplexing symbol in payload data that is actual data.

Further, the data read from the memory 154 is originally encoded by the MSB bit encoding unit 101a or the LSB bit encoding unit 101b while being scrambled so as to guarantee a DC balance and a data transition. Thus, the DC balance and data transition are guaranteed even in the above-described data having a 1-channel multiplexing symbol configuration.

The CDR circuit 136 in the reception circuit 133 of the bridge circuit 130 is phase-synchronized with the synchronization signal embedded in the data from the bridge circuit 140.

The transmission circuit 134 of the bridge circuit 130 embeds 1-bit data read from the memory 153 in the channel ch1 of the multiplexing symbol in response to the synchronization signal.

At this time, in one symbol of the multiplexing symbol, data of the channel ch0 spanning both the amplitude direction and the time direction is shrunk in the amplitude direction, and an invalid portion for one bit of the channel ch1 is generated. Thereby, the transmission circuit 134 embeds 1-bit data read from the memory 153 in the channel ch1.

The transmission circuit 134 transmits such data to the bridge circuit 120. At this time, the data have multiplexing symbols of two channels in which a synchronization code and 2-bit data to be transmitted by the PHY header are embedded in two multiplexing symbols in the synchronization code embedded header, and 1-bit data from each of the memories 153 and 154 is embedded in one symbol of each multiplexing symbol in the payload data.

Further, the data read from the memory 153 is originally encoded by the MSB bit encoding unit 101a or the LSB bit encoding unit 101b while being scrambled so as to guarantee a DC balance and a data transition. Thus, the DC balance and the data transition are guaranteed even in the above-described data having the multiplexing symbols of two channels.

The CDR circuit 126 in the reception circuit 123 of the bridge circuit 120 is phase-synchronized with the synchronization signal embedded in the data from the bridge circuit 130.

The transmission circuit 124 of the bridge circuit 120 embeds 1-bit data read from the memory 152 in the channel ch2 of the multiplexing symbol in response to the synchronization signal.

At this time, within one symbol of each multiplexing symbol, data of channels ch0 and ch1 is shrunk in the time direction, and an invalid portion for two bits including the channel ch2 is generated. Thereby, the transmission circuit 124 embeds 1-bit data of the memory 152 in the channel ch2.

At this time, by a process of the bridge circuit 120, a data length of the LSB bit becomes shorter than a data length of the MSB bit in which the data for the memory 152 is inserted. That is, an invalid portion is generated in one bit of the LSB bit. A DC balance of data may be lost in this state.

Therefore, the transmission circuit 124 adjusts the data length by inserting a particular code into each multiplexing symbol to which 1-bit data read from the memory 152 is added. As the particular code, for example, the data read from the added memory 152 or inverted data of this data are copied to the LSB bit at a location corresponding to the MSB bit to which 1-bit data read from the memory 152 is added. The MSB bit to which the 1-bit data read from the memory 152 is added is a bit in which data of the channel ch2 is embedded, and the LSB bit at a location corresponding to the channel ch2 is a bit in which data of the channel ch3 is embedded.

The same thing occurs in the synchronization code embedded header portion. That is, even in the synchronization code embedded header, the data length of the LSB bit is shorter than the data length of the MSB bit, and thereby, a DC balance of the data may be lost.

Whether the particular code to be inserted into the channel ch3 is set to the data of the channel ch2 or set to inverted data of this data is selected based on, for example, preceding and subsequent multiplexing symbols. Thereby, for example, a DC balance and a data transition of all the data can be easily guaranteed.

The transmission circuit 124 transmits the data to which the particular code is inserted to the bridge circuit 110. The data at this time have multiplexing symbols of the three channels in which a synchronization code and 3-bit data to be transmitted by the PHY header are embedded in two multiplexing symbols in the synchronization code embedded header, and 1-bit data from each of the memories 152 to 154 is embedded in one symbol of each multiplexing symbol in the payload data.

The CDR circuit 116 in the reception circuit 113 of the bridge circuit 110 is phase-synchronized with a synchronization signal embedded in the data from the bridge circuit 120.

The transmission circuit 114 of the bridge circuit 110 embeds the 1-bit data read from the memory 151 in the channel ch3 of the multiplexing symbol in response to the synchronization signal.

The transmission circuit 114 transmits such data to the memory controller 100. The data at this time have multiplexing symbols of four channels in which a synchronization code and 4-bit data to be transmitted by the PHY header are embedded in two multiplexing symbols in the synchronization code embedded header, and 1-bit data from each of the memories 151 to 154 is embedded in one symbol of each multiplexing symbol in the payload data.

The reception circuit 103b of the memory controller 100 receives the data from the bridge circuit 110.

The unmapping unit 102c demodulates the multiplexing symbols received by the reception circuit 103b into an MSB bit data string and an LSB bit data string according to a reverse sequence of the mapping unit 101c.

The MSB bit decoding unit 102a decodes the MSB bit data string from the unmapping unit 102c according to the reverse sequence of the MSB bit encoding unit 101a. The LSB bit decoding unit 102b decodes the LSB bit data string from the unmapping unit 102c according to the reverse sequence of the LSB bit encoding unit 101b.

The decoded MSB bit data string and LSB bit data string are transmitted from the memory controller 100 to the host 2 via the communication interface 180.

As described above, the data read from the memories 151 to 154 is read to the host 2.

Circuit Configuration Example of Bridge Circuit

Figure 8A:
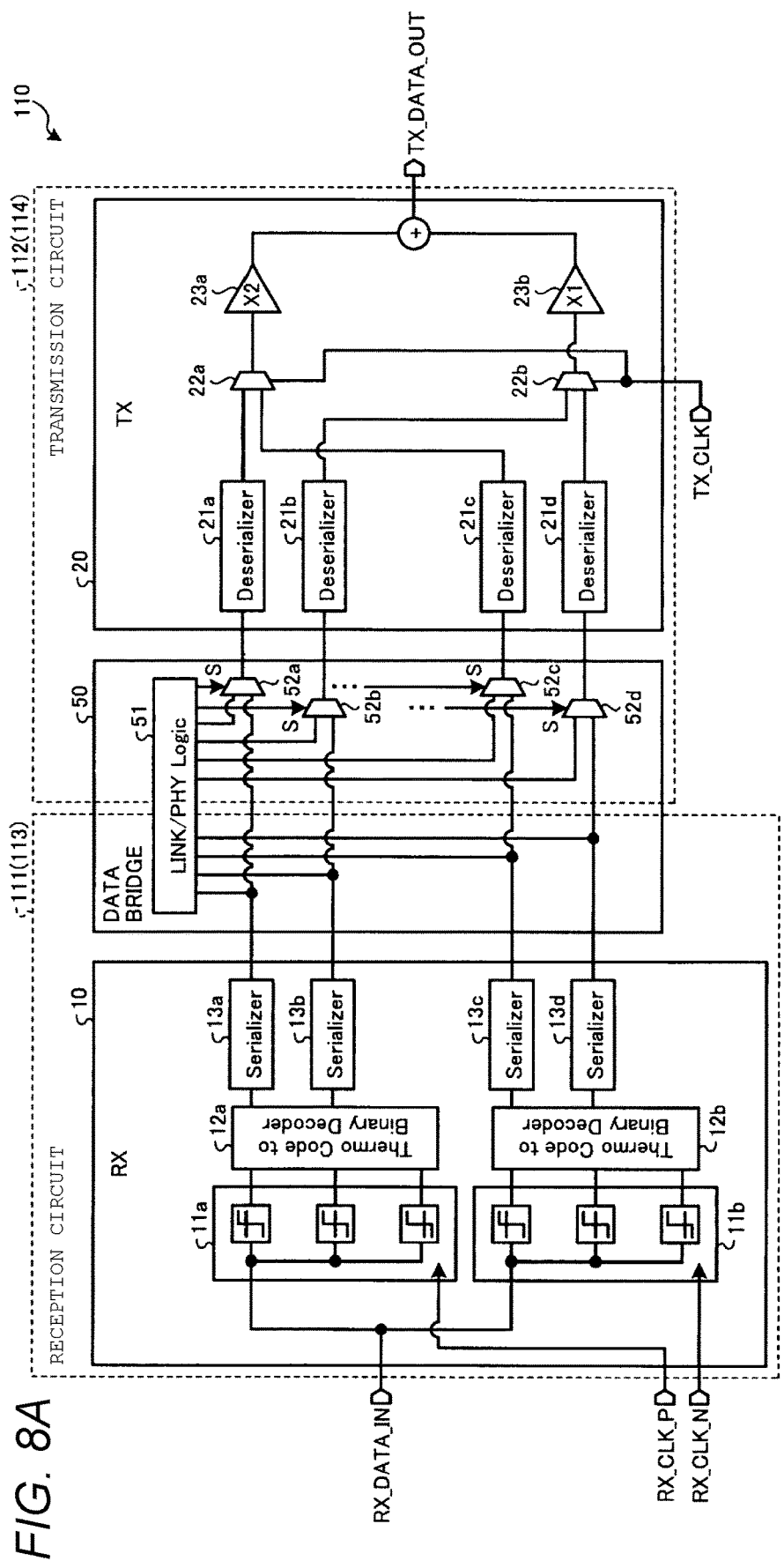
FIGS. 8A to 8C are diagrams illustrating a circuit configuration of a bridge circuit in the memory system according to the first embodiment.
Figure 8B:
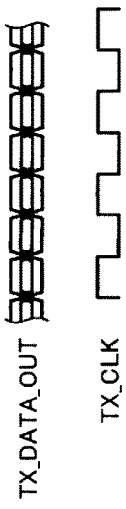
Figure 8C:
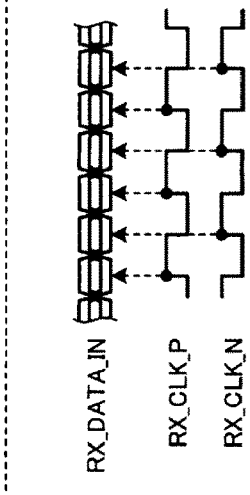

Next, a circuit configuration example of the bridge circuits 110 to 140 will be described with reference to FIGS. 8A to 8C. FIGS. 8A to 8C are diagrams illustrating a circuit configuration of the bridge circuit 110 included in the memory system 1 according to the first embodiment.

As illustrated in FIG. 8A, the bridge circuit 110 includes a plurality of circuits, for example, an RX 10, a data bridge 50, and a TX 20.

The RX 10 includes samplers 11a and 11b, decoders 12a and 12b, and serializers 13a to 13d.

The samplers 11a and 11b are three-threshold samplers that can determine four levels of each of two PAM4 symbols included in one multiplexing symbol received by the RX 10. The synchronization signal RX_CLK_P is input to the sampler 11a. A synchronization signal RX_CLK_N that is an inverted signal of the synchronization signal RX_CLK_P is input to the sampler 11b. The samplers 11a and 11b sample the PAM4 symbol in synchronization with the synchronization signals RX_CLK_P and RX_CLK_N.

The decoders (e.g., Thermo to Binary Decoders) 12a and 12b decode each PAM4 symbol into 2-bit data based on the determination results of the samplers 11a and 11b. For example, the decoder 12a decodes odd-numbered symbol data of consecutive PAM4 symbols, and the decoder 12b decodes even-numbered symbol data of the consecutive PAM4 symbols.

The serializers 13a to 13d convert 1-bit parallel data into serial data. For example, the serializer 13a serializes data of an MSB bit of the odd symbol of the consecutive PAM4 symbols, and the serializer 13b serializes data of an LSB bit of the odd symbol of the consecutive PAM4 symbols. For example, the serializer 13c serializes data of an MSB bit of the even symbol of the consecutive PAM4 symbols, and the serializer 13d serializes data of an LSB bit of the even symbol of the consecutive PAM4 symbols.

The data bridge 50 includes a logic 51 and a plurality of circuits including a plurality of multiplexers 52a to 52d.

The logic (e.g., LINK/PHY Logic) 51 is a logic circuit for inserting and extracting data. That is, the logic 51 extracts data of the channel ch3 for the memory 151 from the multiplexed data of the channels ch0 to ch3 and inserts data of the channel ch2 or inverted data thereof thereinto. Further, the logic 51 inserts the data read from the memory 151 into the channel ch3 among the multiplexed data of the channels ch0 to ch3 and inserts the inserted data or the inverted data of thereof into the MSB bit or the LSB bit corresponding to an insertion location.

The multiplexer 52a selectively outputs either the data of the channel ch0 or the data output from the logic 51. The multiplexer 52b selectively outputs either the data of the channel ch1 or the data output from the logic 51. The multiplexer 52c selectively outputs either the data of the channel ch2 or the data output from the logic 51. The multiplexer 52d selectively outputs either the data of the channel ch3 or the data output from the logic 51.

The TX 20 includes deserializers 21a to 21d, multiplexers 22a and 22b, and amplifiers 23a and 23b.

Each of the deserializers 21a to 21d recovers the serialized 1-bit data to an analog waveform. At this time, data "0" is converted into an inverted waveform of data "1". The deserializer 21a deserializes data of the channel ch0. The deserializer 21b deserializes data of the channel ch1. The deserializer 21c deserializes data of the channel ch2. The deserializer 21d deserializes data of the channel ch3.

A synchronization signal TX_CLK is input to the multiplexers 22a and 22b. The multiplexer 22a selectively outputs either the data of the channel ch0 or the channel ch2 according to the synchronization signal TX_CLK. The multiplexer 22b selectively outputs either data of the channel ch1 or the channel ch3 according to the synchronization signal TX_CLK.

The amplifier 23a receives the data of channel ch0 or channel ch2 and amplifies the received data twice the size. The amplifier 23b receives the data of the channel ch1 or the channel ch3 and amplifies the received data by one time.

Hereinafter, a write operation of a circuit in the bridge circuit 110 will be described.

In the following example, the data of the channels ch0 to ch3 are (1, 1, 0, 1), respectively. In other words, the odd symbols of the consecutive PAM4 symbols are (MSB bits and LSB bits)=(11) and the PAM4 symbol=+3, and even symbols of the consecutive PAM4 symbols are (MSB bits LSB Bit)=(01) and the PAM4 symbol=−1.

Multiplexing symbol data RX_DATA_IN including the two PAM4 symbols as described above is input to the RX 10. The sampler 11a samples predetermined data of the PAM4 symbols according to the synchronization signal RX_CLK_P. As illustrated in FIG. 8B, for example, data sampled at a rising timing of the synchronization signal RX_CLK_P is data of the first symbol of the consecutive PAM4 symbols. The sampler 11a determines that the first symbol of the consecutive PAM4 symbols is +3 because data of the first symbol of the consecutive PAM4 symbols is larger than the maximum of the three thresholds. The decoder 12a decodes this into 2-bit data (11) of an MSB bit and an LSB bit. The serializer 13a outputs "1" as the data of the channel ch0, and the serializer 13b outputs "1" as the data of the channel ch1.

Likewise, the sampler 11b samples predetermined data of the PAM4 symbols according to the synchronization signal RX_CLK_N. As illustrated in FIG. 8B, for example, data sampled at a rising timing of the synchronization signal RX_CLK_N is data of the second symbol of the consecutive PAM4 symbols. The sampler 11b determines that the second symbol of the consecutive PAM4 symbols is −1 because the data of the second symbol of the consecutive PAM4 symbols is between a median value and a minimum value of the three thresholds. The decoder 12b decodes this into 2-bit data (01) of an MSB bit and an LSB bit. The serializer 13c outputs "0" as the data of channel ch2, and the serializer 13d outputs "1" as the data of channel ch3.

The data of each of the channels ch0 to ch3 output from the serializers 13a to 13d is input to each of the multiplexers 52a to 52d. The data of each of the channels ch0 to ch3 is also input to the logic 51. The logic 51 extracts the data of the channel ch3, which is data for the memory 151 connected to the logic 51 and transmits the data to the memory 151 for writing. Further, the logic 51 inputs the data of the channel ch2 or inverted data thereof to the multiplexer 52d. Here, the logic 51 inputs the data of the channel ch2 to the multiplexer 52d.

The multiplexer 52d receives the data of the channel ch3 from the serializer 13d and the data of the channel ch2 from the logic 51. The multiplexer 52d selects and outputs the data of the channel ch2 from the logic 51, that is, the data "0", among the input data in response to the selection signal S from the logic 51.

Meanwhile, the data of the channel ch0 input to the multiplexer 52a, the data of the channel ch1 input to the multiplexer 52b, and the data of the channel ch2 input to the multiplexer 52c are respectively output as they are in response to the selection signal S from the logic 51.

The deserializer 21a receives the data "1" of the channel ch0 and outputs an analog waveform "+1" having a positive value. The deserializer 21b receives the data "1" of the channel ch1 and outputs an analog waveform "+1" having a positive value. The deserializer 21c receives the data "0" of the channel ch2 and outputs an analog waveform "−1" having a negative value. The deserializer 21d receives the data "0" of the channel ch2 inserted into the channel ch3 and outputs an analog waveform "−1" having a negative value.

The multiplexers 22a and 22b are synchronized with the synchronization signal TX_CLK illustrated in FIG. 8C. The multiplexer 22a outputs the data "+1" obtained by converting the data "1" of the channel ch0 received from the deserializer 21a to the amplifier 23a at a rising timing of the synchronization signal TX_CLK. At the same timing, the multiplexer 22b outputs the data "+1" obtained by converting the data "1" of the channel ch1 received from the deserializer 21b to the amplifier 23b. The amplifier 23a amplifies the data "+1" by two times, which is data "+2", and the amplifier 23b amplifies the data "+1" by one time, which is data "+1" and outputs the data. The data "+2" and "+1" are added together to output "+3" of the PAM4 symbol. That is, the data (11) of the channel ch0 and the channel ch1 is converted to "+3" of the PAM4 symbol.

Next, the multiplexer 22a outputs the data "−1" obtained by converting the data "0" of the channel ch2 received from the deserializer 21c to the amplifier 23a at a falling timing of the synchronization signal TX_CLK. At the same timing, the multiplexer 22b outputs the data "−1" obtained by converting the data "0" of the channel ch2 inserted in the channel ch3 received from the deserializer 21d to the amplifier 23b. The amplifier 23a amplifies the data "−1" by two times, which is data "−2", and the amplifier 23b amplifies the data "−1" by one time, which is data "−1" and outputs the data "−1". The data "−2" and "−1" are added together to output "−3" of the PAM4 symbol. That is, data (00) of the channel ch2 and the channel ch2 inserted into the channel ch3 is converted into "−3" of the PAM4 symbol.

As such, multiplexing symbol data TX_DATA_OUT including two PAM4 symbols whose first symbol is "+3" and second symbol is "−3" is output to the bridge circuit 120 in a subsequent stage.

If these the RX 10, the data bridge 50, and the TX 20 are used for the write operation in FIG. 1 described above, a preceding stage of the RX 10 and the data bridge 50 corresponds to the reception circuit 111 of the bridge circuit 110. Further, a subsequent stage of the data bridge 50 and the TX 20 correspond to the transmission circuit 112 of the bridge circuit.

Further, if the RX 10, the data bridge 50, and the TX 20 are used for the read operation in FIG. 1 described above, a preceding stage of the RX 10 and the data bridge 50 corresponds to the reception circuit 113 of the bridge circuit 110. Further, the subsequent stage of the data bridge 50 and the TX 20 correspond to the transmission circuit 114 of the bridge circuit.

A read operation of the reception circuits 113 and 114 is performed in the same manner as the above-described write operation.

In the same manner as in the example of the write operation described above, when the data of the channels ch0 to ch3 are (1, 1, 0, 1), the serializers 13a to 13d respectively output the data "1" of the channel ch0, the data "1" of the channel ch1, the data "0" of the channel ch2, and the data "0" of the channel ch2 inserted into the channel ch3. The data "0" of the channel ch2 inserted into the channel ch3 is data inserted by the bridge circuit 120 in a previous stage.

The data of the channels ch0 to ch3 respectively output from the serializers 13a to 13d are input to the respective multiplexers 52a to 52d. The data of each of the channels ch0 to ch3 is also input to the logic 51. The logic 51 inputs the data "1" read from the memory 151 to the multiplexer 52d corresponding to the channel ch3 to which the data read from the memory 151 connected to the logic 51 is embedded among the channels ch0 to ch3.

The data "0" of the channel ch2 inserted into the channel ch3 from the serializer 13d and the data "1" read from the memory 151 from the logic 51 are input to the multiplexer 52d. The multiplexer 52d selects and outputs the data "1" read from the memory 151 among the data from the logic 51. Meanwhile, the data of the channels ch0 to ch2 input to the multiplexers 52a to 52c are output as they are.

The deserializer 21d receives the data "1" of the channel ch3 and outputs "+1" of an analog waveform. The other deserializers 21a to 21c receive the same data as in the above-described write operation and output the same analog waveform.

2-bit data corresponding to the first symbol of the consecutive PAM4 symbols output from the multiplexers 22a and 22b is data (11) of the channels ch0 and ch1 as in the above-described write operation, and these are summed by the amplifiers 23a and 23b, and "+3" of the PAM4 symbol is output.

The multiplexers 22a and 22b output data (01) of the channels ch2 and ch3 as 2-bit data corresponding to the second symbol of the continuous PAM4 symbols, and these are summed by the amplifiers 23a and 23b and "−1" of the PAM4 symbol is output.

As such, the multiplexing symbol data TX DATA OUT including two PAM4 symbols whose first symbol is "+3" and second symbol is "−1" is output to the memory controller 100.

The reception circuits 121 to 141 and the transmission circuits 122 to 132 of the bridge circuits 120 to 140 can also have the same configuration as the RX 10, the data bridge 50, and the TX 20 described above. That is, data written to the memories 152 to 154 connected to a preceding stage of the RX 10 and the data bridge 50 is extracted and written at the preceding stage of the RX10 and the data bridge 50, and the written data are removed at a subsequent stage of the data bridge 50 and the TX 20, and a particular code can be inserted into an invalid portion after the removal. That is, the data written to the memories 152 to 154 is replaced with the particular code.

Further, the reception circuits 123 to 133 and the transmission circuits 124 to 144 of the bridge circuits 120 to 140 can also have the same configuration as the RX 10, the data bridge 50, and the TX 20 described above. That is, multiplexed data of the channels ch0 to ch2 is received at the preceding stage of the RX 10 and the data bridge 50, and the data read from the memories 152 to 154 connected to the preceding stage of the RX 10 and the data bridge 50 are inserted at the subsequent stage of the data bridge 50 and the TX 20, and a particular code can be further inserted into an invalid portion corresponding to the insertion portion. That is, a part of the received data is replaced with data read from the memories 152 to 154.

Process Example of Bridge Circuit

Next, process performed by the bridge circuits 110 to 140 according to the first embodiment will be described with reference to FIGS. 4, 7, 9, and 10. First, a sequence of a write operation of the bridge circuits 110 to 140 according to the first embodiment will be described with reference to FIGS. 4 and 9. FIG. 9 is a flowchart of a write operation sequence of the bridge circuits 110 to 140 according to the first embodiment.

As illustrated in FIGS. 4 and 9, the reception circuit 111 of the bridge circuit 110 receives, from the memory controller 100, data of PAM4 symbols in which an encoding process of guaranteeing a DC balance and a data transition is performed and to which a synchronization code embedded header is added (S101).

The reception circuit 111 reads data for the memory 151 from the multiplexing symbol data (S102), and writes the read data to the memory 151 (S103). The data are read from a synchronization code embedded header portion and a payload data portion which is actual data.

When the bridge circuit 110 is not the last bridge circuit (that is, the bridge circuit farthest from the memory controller 100) (S104: No), the transmission circuit 112 removes the data for the memory 151 from the multiplexing symbol data (S105). The data are removed from the synchronization code embedded header portion and the payload data portion.

Thereby, when there is a possibility that the DC balance of the multiplexing symbol data is lost (S106: Yes), the transmission circuit 112 transmits data obtained by adding (S107) a particular code to the channel ch3 from which the data for the memory 151 is removed to the next bridge circuit 120 (S108). The particular code is added to the synchronization code embedded header portion and the payload data portion.

The reception circuit 121 of the bridge circuit 120 reads data for the memory 152 from the multiplexing symbol data to which the particular code is added, and writes the data to the memory 152 (S101 to S103).

When the bridge circuit 120 is not the last bridge circuit (S104: No), the transmission circuit 122 removes the data for the memory 152 from the multiplexing symbol data (S105).

Thereby, when there is no possibility that the DC balance of the multiplexing symbol data is lost (S106: No), the transmission circuit 122 transmits the data to the next bridge circuit 130 as it is (S108).

The same processes (S101 to S108) are also performed in the bridge circuit 130, and the same processes (S101 to S103) are also performed in the bridge circuit 140.

Since the bridge circuit 140 is the last bridge circuit (S104: Yes), the process ends. Thereby, the write operations of the bridge circuits 110 to 140 according to the first embodiment are completed.

Figure 10:
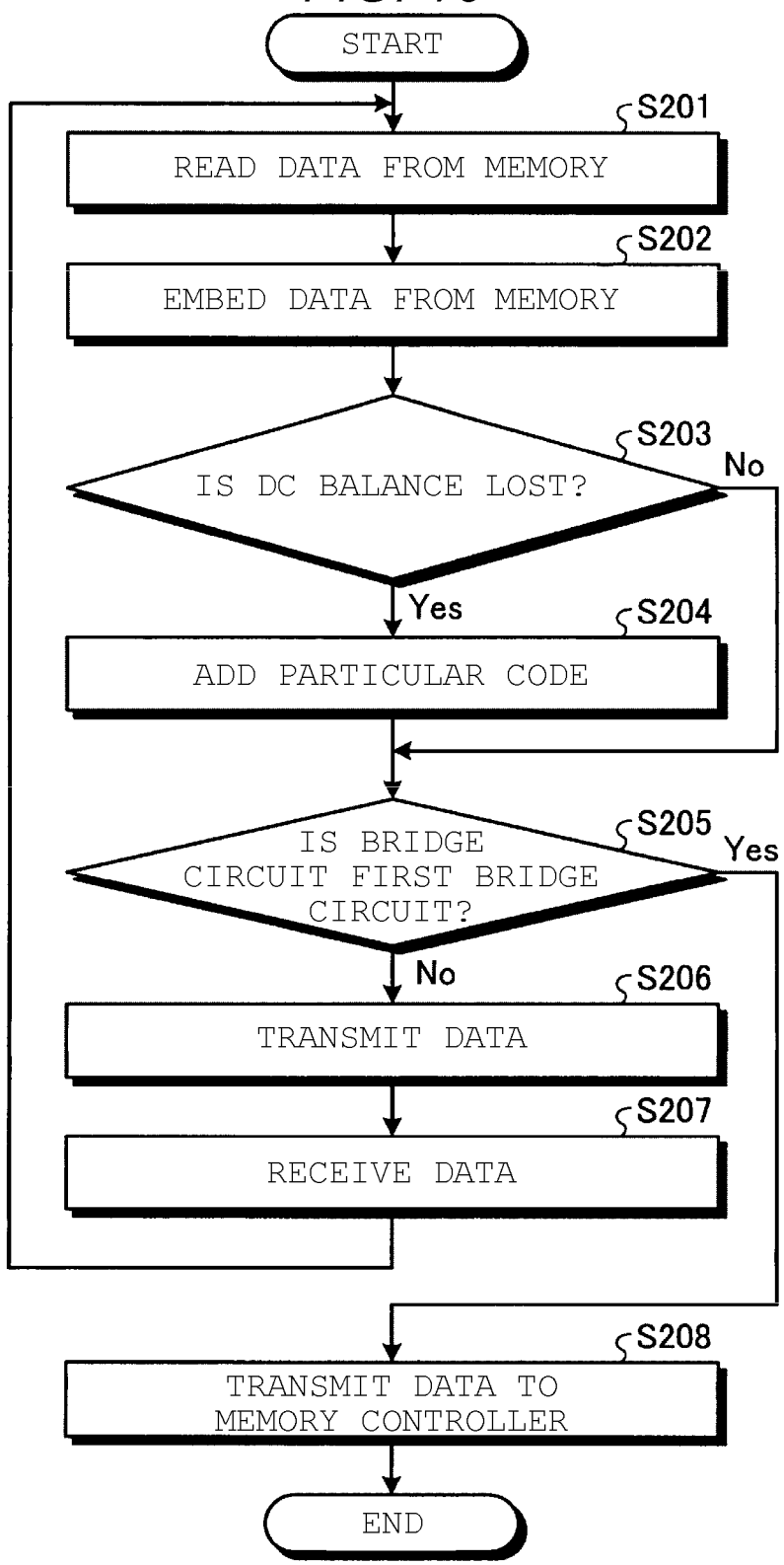
FIG. 10 is a flowchart illustrating a read operation sequence of the bridge circuit according to the first embodiment.

Next, a read operation sequence of the bridge circuits 110 to 140 according to the first embodiment will be described with reference to FIGS. 7 and 10. FIG. 10 is a flowchart of the read operation sequence of the bridge circuits 110 to 140 according to the first embodiment.

As illustrated in FIGS. 7 and 10, the transmission circuit 144 of the bridge circuit 140 reads data from the memory 154 (S201), and generates multiplexing symbol data in which the data are embedded (S202). The data are embedded in the synchronization code embedded header portion and the payload data portion.

At this time, there is no possibility that the DC balance of the data is lost (S203: No), and when the bridge circuit 140 is not the first bridge circuit (that is, the bridge circuit closest to the memory controller 100) (S205: No), the transmission circuit 144 transmits the data to the next bridge circuit 130 as it is (S206).

The same processes (S201 to S206) are also performed in the bridge circuit 130 that receives (S207) the data from the bridge circuit 140 by the using reception circuit 133. The transmission circuit 134 of the bridge circuit 130 transmits data to the next bridge circuit 120 (S206).

The reception circuit 123 of the bridge circuit 120 receives data from the bridge circuit 130 (S207). The transmission circuit 124 of the bridge circuit 120 reads the data from the memory 152 and embeds the read data in the multiplexing symbol data from the reception circuit 123 (S201 to S202).

At this time, when there is a possibility that the DC balance of the data is lost (S203: Yes), the transmission circuit 124 adds a particular code to the channel ch3 corresponding to the channel ch2 in which the data for the memory 152 is embedded (S204). The particular code is added to the synchronization code embedded header portion and the payload data portion.

Since the bridge circuit 120 is not the first bridge circuit (S205: No), the transmission circuit 124 transmits data to which the particular code is added to the next bridge circuit 110 (S206).

The bridge circuit 110 repeats the same processes as the processes of the bridge circuits 140 and 130 (S201 to S203: No) and is the first bridge circuit (S205: Yes), the transmission circuit 114 of the bridge circuit 110 transmits the data to the memory controller 100 (S208). Thereby, the read operation of the bridge circuits 110 to 140 according to the first embodiment ends.

Comparative Example

In a memory system according to a comparative example which does not have the above-described configuration, how to guarantee a DC balance and a zero crossing transition is an issue in performing high-speed serial bridge communication of PAM4 or the like.

For example, the memory system according to the comparative example reads and removes data for a memory from multiplexing symbol data, and then fills the portion from which the data are removed with 0 or 1. However, in this case, the data are biased to "0" or "1", and there is a possibility that a DC balance is lost. Further, it is necessary for PAM4 and the like to be embedded in data of a synchronization signal, but in this case, it is desirable to reduce data redundancy as much as possible.

According to the memory system 1 of the first embodiment, when any data for the memories 151 to 154 is read from the data with guaranteed DC balance and is removed, when there is a possibility that the DC balance of the data is lost, a particular code is inserted into the multiplexing symbol. Thereby, the DC balance of the data after removal of the data for the memories 151 to 154 can be maintained.

According to the memory system 1 of the first embodiment, the particular code inserted into the multiplexing symbol is an MSB bit at a location corresponding to an LSB bit from which data are removed, or data of the LSB bit for the MSB bit from which data are removed, or inverted data of thereof. Thereby, DC balance is easily secured.

According to the memory system 1 of the first embodiment, a synchronization code embedded header in which a synchronization code is embedded is added to data transmitted to the bridge circuits 110 to 140. Thereby, the bridge circuits 110 to 140 can be synchronized.

According to the memory system 1 of the first embodiment, the synchronization code embedded header guarantees the zero crossing transition of data in the configuration of the multiplexing symbols of 1 to 4 channels. Thereby, even if the data are sequentially removed, the bridge circuits 110 to 140 can be synchronized.

According to the memory system 1 of the first embodiment, the synchronization code embedded header has a configuration in which 4-bit data arranged in a synchronization code using the eight channels ch0 to ch3 as in the example of FIGS. 5A to 5C. Alternatively, the synchronization code embedded header has a configuration in which the 4-bit data are arranged in the synchronization code using the 12 channels ch0 to ch3 as in the example of FIGS. 6A and 6B. Thereby, it is possible to guarantee the zero crossing transition while transmitting 1-bit information of each of the channels ch0 to ch3 with a small number of bits.

According to the memory system 1 of the first embodiment, the channels ch0 to ch3 included in the synchronization code embedded header include data encoded independently of each other. Thereby, data of each of the channels ch0 to ch3 can be generated and taken out without knowing the data of each of the channels ch0 to h3.

According to the memory system 1 of the first embodiment, when data read from any of the memories 151 to 154 is embedded in the data with a guaranteed DC balance, in a case where there is a possibility that the DC balance of the data is lost, a particular code is inserted into the multiplexing symbol. Thereby, the DC balance of the data after embedding the data for the memories 151 to 154 can be maintained.

According to the memory system 1 of the first embodiment, the particular code inserted into the multiplexing symbol is an MSB bit for an LSB bit in which the read data are embedded, or data of the LSB bit for the MSB bit in which the read data are embedded, or inverted data thereof. Thereby, a DC balance is easily secured.

According to the memory system 1 of the first embodiment, a synchronization code embedded header in which a synchronization code is embedded is added to data from the bridge circuits 110 to 140. Thereby, the bridge circuits 110 to 140 and the memory controller 100 can be synchronized.

According to the memory system 1 of the first embodiment, a synchronization code embedded header guarantees a zero crossing transition of data in a configuration of multiplexing symbols of 1 to 4 channels. Thereby, the bridge circuits 110 to 140 can be synchronized even while data are sequentially inserted.

According to the memory system 1 of the first embodiment, the channels ch0 to ch3 included in the synchronization code embedded header include data encoded independently of each other. Thereby, each of the bridge circuits 110 to 140 can generate data of each of the channels ch0 to ch3 without knowing the data of each of the channels ch0 to ch3.

Second Embodiment

A memory system according to the second embodiment has a data configuration different from the configuration of the memory system 1 according to the first embodiment. Hereinafter, the second embodiment will be described in detail with reference to the drawings.

Write Operation Example of Memory System

Figure 11:
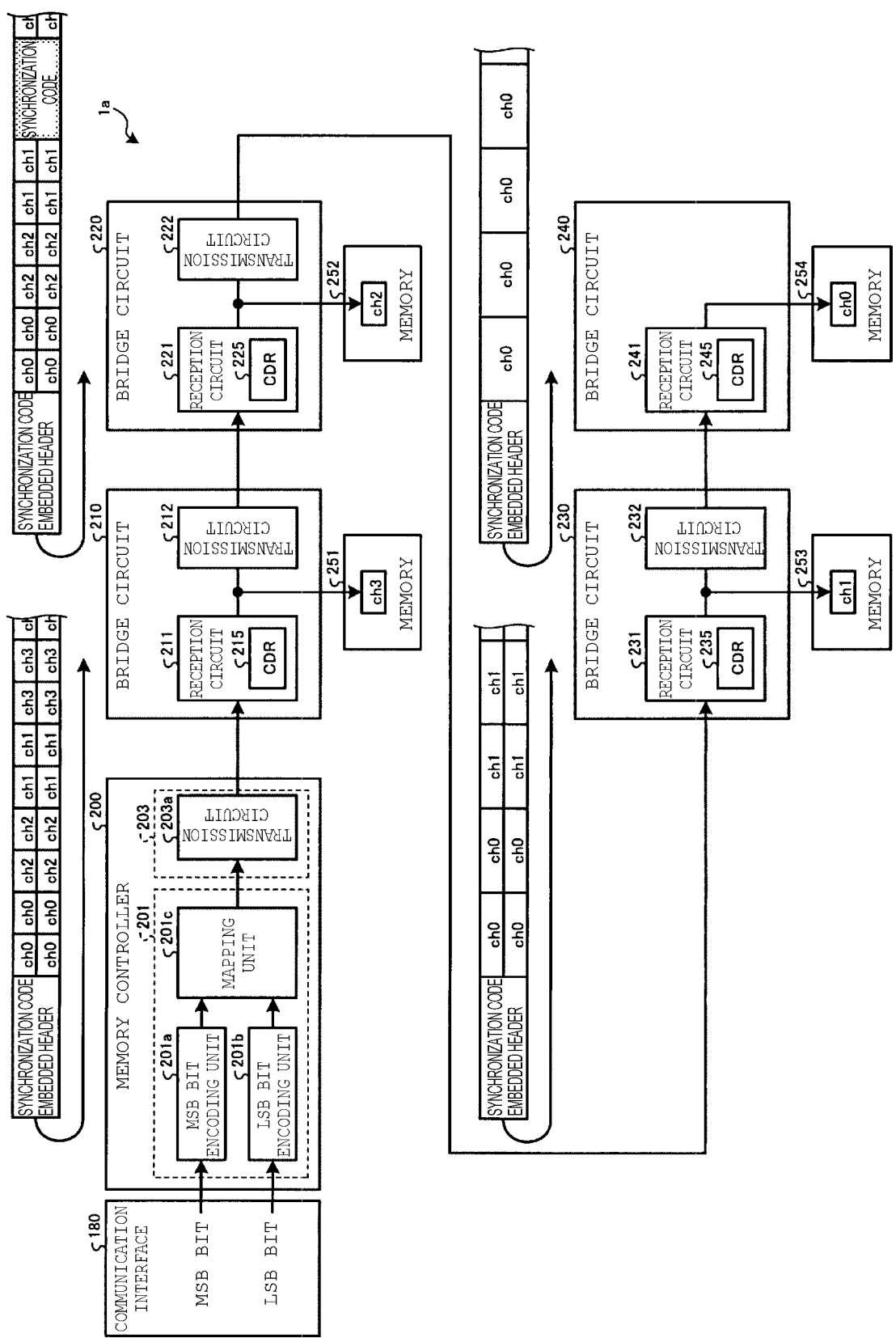
FIG. 11 is a diagram illustrating a write operation performed by a memory system according to a second embodiment.

FIG. 11 is a diagram illustrating a write operation performed by the memory system 1a according to the second embodiment. As illustrated in FIG. 11, in a memory system 1a of the second embodiment, arrangement of channels ch0 to ch3 in multiplexing symbols and the transmission order of the channels ch0 to ch3 are different from the first embodiment.

Specifically, each multiplexing symbol includes four consecutive bits for the channel ch0, the channel ch1, the channel ch2, or the channel ch3. The four consecutive bits are, for example, four consecutive bits in the order of transmission, and specifically, four bits which are transmitted continuously in order of an nth bit of the MSB bit, an nth bit of the LSB bit, an (n+1)th bit of the MSB bit, and an (n+1)th bit of the LSB bit. Each of the channels ch0 to ch3 is transmitted, for example, in order of channels ch0, ch2, ch1, and ch3.

Assignment of the memories 251 to 254 to the channels ch0 to ch3 is as follows. That is, the channel ch0 is assigned as a data region of the memory 254, the channel ch1 is assigned as a data region of the memory 253, the channel ch2 is assigned as a data region of the memory 252, and the channel ch3 is assigned as a data region of the memory 251.

The MSB bit encoding unit 201a and the LSB bit encoding unit 201b perform encoding by scrambling to guarantee a DC balance and a data transition for each channel ch0 to ch3. Thus, data of the multiplexing symbols arranged in this way also becomes data in which the DC balance and the data transition are guaranteed.

Further, a PHY header is added to the beginning of the multiplexing symbol data. The PHY header becomes a synchronization code embedded header in which a synchronization code is embedded in various types of information included in the PHY header. The synchronization code embedded header according to the second embodiment will be described below.

A data string from the host is encoded by the memory controller 200, mapped to PAM4 symbols, converted into multiplexing symbols, and transmitted to the bridge circuit 210.

The reception circuit 211 of the bridge circuit 210 reads 4-bit data of the channel ch3 that is data for the memory 251 from one multiplexing symbol and writes the data to the memory 251 in response to a synchronization signal in which the CDR circuit 215 is phase-synchronized. The reception circuit 211 transmits the multiplexing symbol to the transmission circuit 212.

The transmission circuit 212 of the bridge circuit 210 removes the 4-bit data of the channel ch3, which is the data for the memory 251, from one multiplexing symbol, in response to the synchronization signal.

At this time, there is a possibility that a DC balance of the data is lost due to a process of the bridge circuit 210.

Therefore, the transmission circuit 212 inserts a particular code into each multiplexing symbol from which 4-bit data of the channel ch3 for the memory 251 is removed to fill an invalid portion. The particular code is data other than the removed 4-bit data for the memory 251 and a synchronization code is inserted which guarantees the DC balance and zero crossing transition, for example, a combination of data (00) and (11).

For example, a combination of the particular codes inserted into the channel ch3 is selected based on a value of the preceding and subsequent multiplexing symbol data. Thereby, for example, the DC balance and data transition of all the data are easily guaranteed.

The transmission circuit 212 transmits the data with the inserted particular code to the bridge circuit 220.

In the same manner as the reception circuit 211 and transmission circuit 212 described above, the bridge circuits 220 to 230 read 4-bit data of the corresponding channel from one multiplexing symbol, write the data to the corresponding memory, and remove the 4-bit data of the channel to which data are written from the one multiplexing symbol.

At this time, there is no possibility that the DC balance of the data is lost due to the processes of the bridge circuits 220 and 230. Thus, the remaining channel data are used to fill in the removed bit.

The bridge circuit 240 reads the 4-bit data of the channel ch0 which is data for the memory 254 from one multiplexing symbol and controls writing to the memory 254.

As described above, the data string from the host is written to the memories 251 to 254.

Read Operation Example of Memory System

A read operation of the memory system 1a according to the second embodiment is performed so as to reverse the above-described write operation. In the read operation of the memory system 1a according to the second embodiment, in a case where data are inserted into the channels ch0 to ch3 corresponding thereto by the process of any of the bridge circuits 110 to 140, when there is a possibility that a DC balance of the data is lost, a particular code is inserted into an MSB bit and an LSB bit adjacent to the channels ch0 to ch3 into which data has been inserted most recently.

Configuration Example of Synchronization Code Embedded Header

Next, a configuration of a synchronization code embedded header added to multiplexing symbol data transmitted from the memory controller 200 to the bridge circuit 210 will be described with reference to FIGS. 12A to 12D. FIGS. 12A to 12D are diagrams illustrating a data configuration of multiplexing symbols handled by the memory system 1a according to the second embodiment.

As illustrated in FIG. 12A, the synchronization code embedded header includes the channel ch0, the channel ch1, the channel ch2, and the channel ch3, each including four consecutive bits. Further, the channels ch0 to ch3 are transmitted, for example, in order of the channels ch0, ch2, ch1, and ch3, in the same manner as the configuration of payload data that is actual data.

Each of the channels ch0 to ch3 includes information on the channels ch0 to ch3 of payload data. Specifically, each of the channels ch0 to ch3 includes, for example, a data identification bit for transmitting information for identifying whether the payload data to be transmitted is data or a command. Further, each of the channels ch0 to ch3 includes, for example, a DC control bit for transmitting information on a method for maintaining a DC balance of the payload data. The method for maintaining the DC balance of the payload data includes, for example, a method in which any bit in the payload data is an inverted bit, and a method in which the MSB bit and the LSB bit at a location corresponding to the MSB bit are replaced with each other.

Further, a 2-bit synchronization code is embedded in the channel ch0 to guarantee a zero crossing transition of data. Accordingly, the number of bits that channel ch0 can use for a data identification bit and a DC control bit is 2 bits. That is, the channel ch0 can include 1-bit information as the data identification bit and includes the remaining 1-bit information as the DC control bit. For example, the DC control bit of channel ch0 can be transmitted by including information that the bit of channel ch0 in the payload data is an inverted bit.

Meanwhile, in the other channels ch1 to ch3, a zero crossing transition of data is not guaranteed. Accordingly, respective four bits of the channels ch1 to ch3 can be used as the data identification bit and the DC control bit. Thus, the channels ch1 to ch3 can include 1-bit information as the data identification bit and include information of the remaining 3 bits as the DC control bits.

The channels ch1 to ch3 use one bit of the DC control bits to transmit, for example, information that the MSB bits of the corresponding channels ch1 to ch3 in the payload data are inverted bits. Further, the channels ch1 to ch3 use another one bit of the DC control bits to transmit, for example, information that the LSB bits of the corresponding channels ch1 to ch3 in the payload data are inverted bits. Further, the channels ch1 to ch3 use the remaining 1 bit of the DC control bit to transmit, for example, information that the MSB bits and LSB bits of the corresponding channels ch1 to ch3 in the payload data are replaced with each other.

For example, an encoding process of a 64B66B method can be used to generate the synchronization code embedded header.

FIG. 12B illustrates a state of the payload data when one bit of the DC control bit of the channel ch0 includes information that the bit of the channel ch0 of the payload data is an inverted bit. In this case, the bit data of all the channels ch0 in the payload data are inverted bits. Hatching of the channel ch0 in FIG. 12B indicates that the bit data of the channel ch0 is inverted bits.

FIG. 12C illustrates a state of the payload data when one bit of the DC control bits of the channel ch1 includes information that the MSB bit of the channel ch1 in the payload data is an inverted bit, one bit of the DC control bits of the channel ch2 includes information that the LSB bit of channel ch2 in the payload data is an inverted bit, and one bit of the DC control bits of the channel ch3 includes information that the LSB bit of channel ch3 in the payload data is an inverted bit. In this case, the MSB bit data of all channels ch1 in the payload data are inverted bits, and the LSB bit data of all channels ch2 are inverted bits, and the LSB bit data of all channels ch3 are inverted bits. Hatching of the channel ch1 in FIG. 12C indicates that the MSB bit data of the channel ch1 is an inverted bit. Hatching of the channels ch2 and ch3 in FIG. 12C indicates that the LSB bit data of the channels ch2 and ch3 are inverted bits.

FIG. 12D illustrates a state of the payload data when one bit of the DC control bits of the channel ch3 includes information that the MSB bit and LSB bit of the channel ch3 in the payload data are replaced with each other. In this case, the MSB bit data and LSB bit data of all the channels ch3 in the payload data are replaced with each other. Hatching of the channel ch3 in FIG. 12D indicates that the MSB bit data and LSB bit data of the channel ch3 are replaced with each other.

Regardless of the examples of FIGS. 12B to 12D, various methods may be combined by using 1 bit of the channel ch0 and 3 bits of the channels ch1 to ch3 of the payload data. For example, one or more methods may be applied to one or more of the channels ch0 to ch3, and all methods may be applied to one of the channels ch0 to ch3.

Comparative Example

In a memory system according to a comparative example not having the above-described configuration, for example, data are transmitted in order of the channels ch0, ch1, ch2, and ch3. Thereby, there is a problem illustrated in FIGS. 13A to 13D in addition to the above-described problem of how to guarantee a DC balance and a zero crossing transition.

If data of the channel ch3 is extracted as illustrated in FIG. 13A and data of the channel ch2 is extracted as illustrated in FIG. 13B, eight bits that are substantially invalid are generated to be adjacent to the channel ch1. When the invalid eight bits are filled by using data of the channels ch0 and ch1, the data of channel ch1 has to be buffered and mapped again.

Alternatively, as illustrated in FIG. 13C, the invalid portion can be filled with an 8-bit synchronization code, but operation at a full rate is required to transmit data for two channels.

Meanwhile, in the memory system 1a according to the second embodiment, if the data of the channel ch3 is extracted as illustrated in FIG. 14A, and the data of the channel ch2 is extracted as illustrated in FIG. 14B, the invalid portions of four bits are adjacent to the channel ch0 and channel ch1, respectively. Thus, for example, the data of channel ch1 is buffered and is not remapped, and the invalid portion is filled by using the data of channels ch0 and ch1 as illustrated in FIGS. 14C and 14D.

According to the memory system 1a of the second embodiment, data are transmitted in order of the channels ch0, ch2, ch1, and ch3. Thereby, after the data of the channels ch2 and ch3 are removed, the invalid portion can be filled easily by using the data of channels ch0 and ch1 without buffering.

According to the memory system 1a of the second embodiment, when data for any of the memories 251 to 254 is read and removed from the data with the guaranteed DC balance, in a case where there is a possibility that a DC balance of the data is lost, the synchronization code is inserted into the multiplexing symbol. Thereby, a zero crossing transition can be additionally generated while maintaining a DC balance. Thus, more stable data transmission is possible.

According to the memory system 1a of the second embodiment, a synchronization code embedded header in which a synchronization code is embedded is added to the data transmitted to the bridge circuits 210 to 240. Thereby, the respective bridge circuits 210 to 240 can be synchronized.

According to the memory system 1a of the second embodiment, the synchronization code is embedded in the channel ch0 transmitted first and removed last in the synchronization code embedded header. Thereby, a zero crossing transition of data is guaranteed while passing through the bridge circuits 210-240. Here, the removal means that the data are extracted, that is, the data are removed after being read.

According to the memory system 1a of the second embodiment, many DC control bits and the like can be assigned to the other channels ch1 to ch3 in the synchronization code embedded header. Thereby, a DC balance of each channel in the payload data can be controlled. Thus, it is possible to reduce the redundancy of the payload data and to increase an effective data rate.

Third Embodiment

A memory system according to a third embodiment has a data configuration different from the configurations of the memory systems 1 and 1a according to the first and second embodiments. Hereinafter, the third embodiment will be described in detail with reference to the drawings.

Write Operation Example of Memory System

Figure 15:
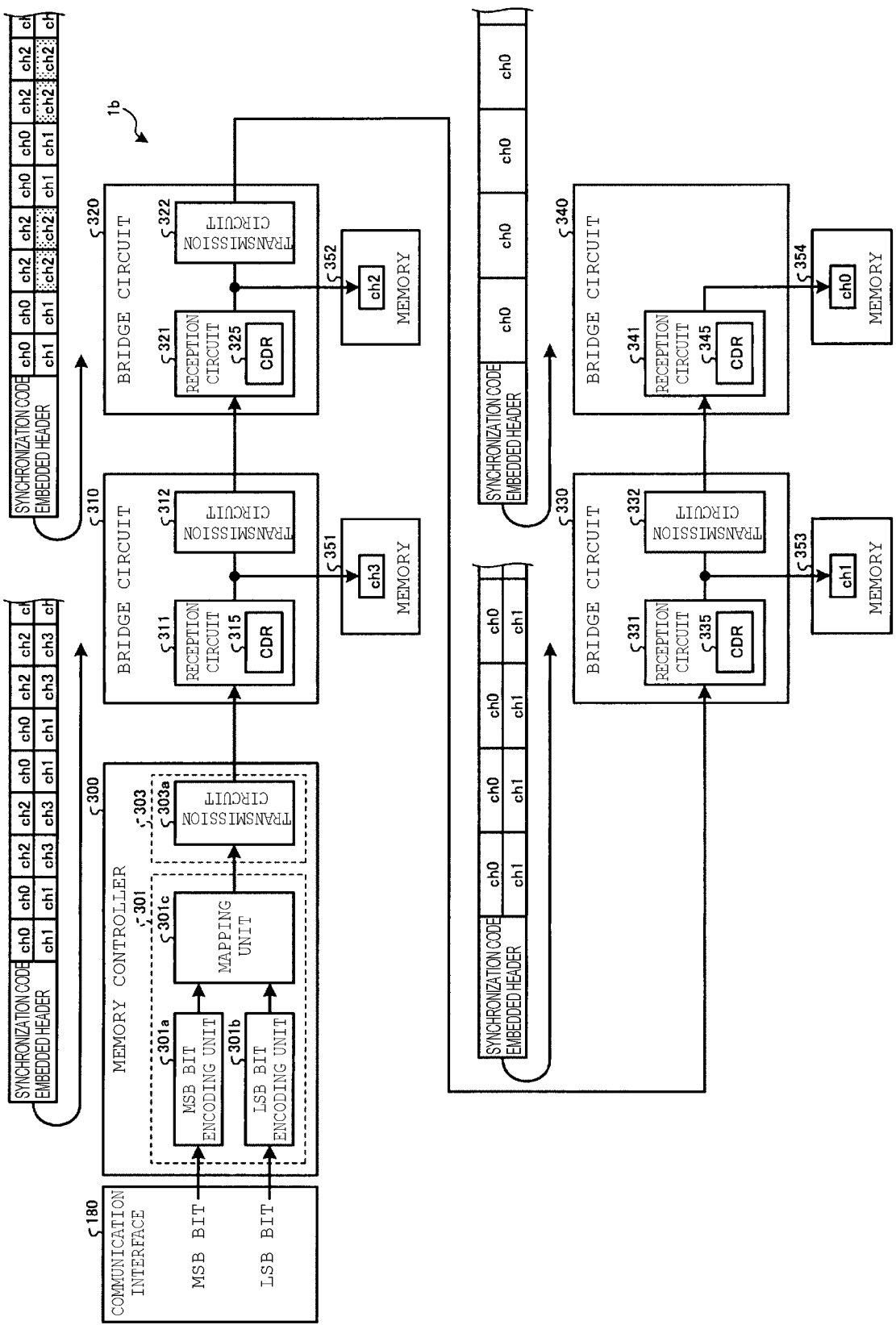
FIG. 15 is a diagram illustrating a write operation performed by a memory system according to a third embodiment.

FIG. 15 is a diagram illustrating a write operation performed by a memory system 1b according to the third embodiment. As illustrated in FIG. 15, in the memory system 1b according to the third embodiment, channels ch0 to ch3 making up a multiplexing symbol and the transmission order of the channels ch0 to ch3 are different from the first and second embodiments.

Specifically, each multiplexing symbol is configured from a combination of the channel ch0 of two consecutive bits in the MSB bits and the channel ch1 of two consecutive bits in the LSB bits, or a combination of the channel ch2 of two consecutive bits in the MSB bits and the channel ch3 of two consecutive bits in the LSB bits. The two consecutive bits of the channels ch0 and ch2 are the MSB bit of an nth bit and the MSB bit of an (n+1)th bit. The two consecutive bits of the channels ch1 and ch3 are the LSB bit of the nth bit and the LSB bit of the (n+1)th bit. Further, the channels ch0 to ch3 are transmitted in order of, for example, the channels ch0, ch1, ch0, ch1, ch2, ch3, ch2, and ch3.

Assignment of the memories 351 to 354 to the channels ch0 to ch3 is as follows. That is, the channel ch0 is assigned as a data region of the memory 354, the channel ch1 is assigned as a data region of the memory 353, the channel ch2 is assigned as a data region of the memory 352, and the channel ch3 is assigned as a data region of the memory 351.

An MSB bit encoding unit 301a and an LSB bit encoding unit 301b perform encoding by scrambling for each of the channels ch0 to ch3 so as to guarantee a DC balance and a data transition. Thus, data of the multiplexing symbols arranged in this way also becomes data in which the DC balance and data transition are guaranteed.

Further, a PHY header is added to the beginning of the multiplexing symbol data. The PHY header is a synchronization code embedded header in which a synchronization code is embedded in various types of information included in the PHY header. The synchronization code embedded header according to the third embodiment will be described below.

The data string from the host is encoded by the memory controller 300, mapped to a PAM4 symbol, converted into a multiplexing symbol, and transmitted to the bridge circuit 310.

The reception circuit 311 of the bridge circuit 310 reads 2-bit data of the channel ch3 that is data for the memory 351 from the multiplexing symbol, and writes the data to the memory 351 in response to a synchronization signal in which the CDR circuit 315 is phase-synchronized. The reception circuit 311 transmits the multiplexing symbol to the transmission circuit 312.

The transmission circuit 312 of the bridge circuit 310 removes the 2-bit data of the channel ch3, which is data for the memory 351, from the multiplexing symbol in response to the synchronization signal.

At this time, there is a possibility that a DC balance of the data is lost due to a process of the bridge circuit 310.

Therefore, the transmission circuit 312 fills an invalid portion by inserting a particular code into each multiplexing symbol from which the 2-bit data for the memory 351 is removed. The particular code is data other than the removed 2-bit data for the memory 351, for example, data of an LSB bit corresponding to the channel ch3 from which the data are removed, that is, 2-bit data of the channel ch2 or inverted data thereof is copied.

Whether the particular code to be inserted into the channel ch3 is set to the data of the channel ch2 or set to the inverted data thereof is selected based on, for example, preceding and subsequent multiplexing symbols. Thereby, for example, a DC balance and a data transition of all the data can be easily guaranteed.

Alternatively, the particular code may be a code 01 or a code 10. Whether the particular code to be inserted into the channel ch3 is set to the code 01 or the code 10 is determined based on, for example, the preceding and subsequent multiplexing symbols. Thereby, for example, the DC balance and data transition of all the data are easily guaranteed.

The transmission circuit 312 transmits the data with the particular code inserted thereinto to the bridge circuit 320.

In the same manner as the reception circuit 311 and the transmission circuit 312 described above, the bridge circuits 320 to 330 read 2-bit data of the corresponding channel from one multiplexing symbol, write the data to the corresponding memory, and remove the 2-bit data of the channel to which the data are written from the one multiplexing symbol.

At this time, there is no possibility that the DC balance of the data is lost due to the processes of the bridge circuits 320 and 330. Thus, the remaining channel data are used to fill in the removed bits.

The bridge circuit 340 reads 2-bit data of the channel ch0, which is data for the memory 354, from one multiplexing symbol, and writes the data to the memory 354.

As described above, the data string from the host is written to the memories 351 to 354.

Read Operation Example of Memory System

A read operation of the memory system 1b according to the third embodiment is performed so as to reverse the above-described write operation. In the read operation of the memory system 1b according to the third embodiment, in a case where data are inserted into the channels ch0 to ch3 corresponding thereto by the process of any of the bridge circuits 310 to 340, when there is a possibility that a DC balance of the data is lost, a particular code is inserted into an MSB bit or an LSB bit adjacent to the channels ch0 to ch3 into which data has been inserted most recently.

Configuration Example of Synchronization Code Embedded Header

Next, a configuration of a synchronization code embedded header added to multiplexing symbol data transmitted from the memory controller 300 to the bridge circuit 310 will be described by using FIGS. 16A to 17D.

FIGS. 16A to 16D are diagrams illustrating a data configuration of multiplexing symbols handled by the memory system 1b according to the third embodiment.

Figures 16A, 16B, 16C, 16D:
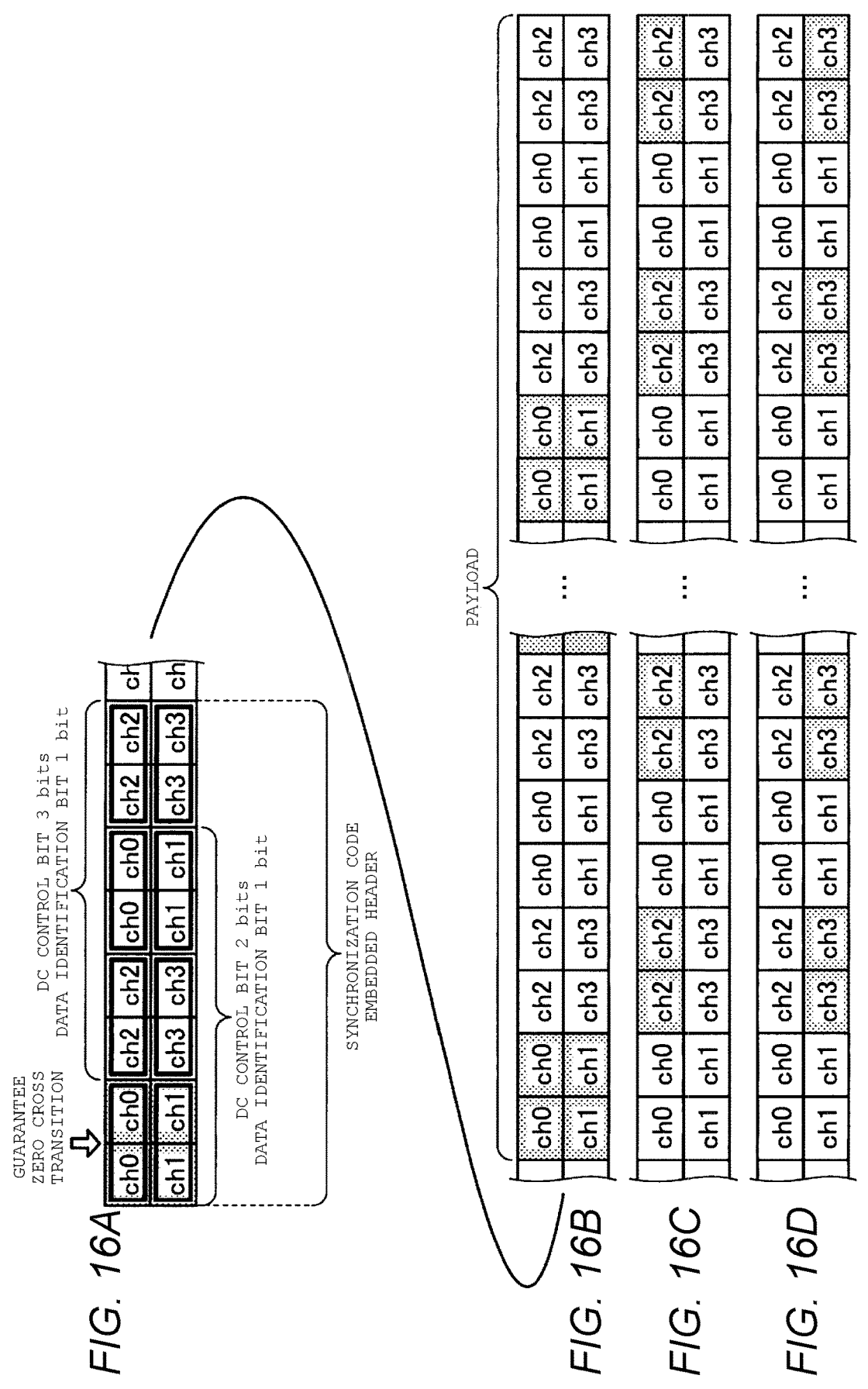

As illustrated in FIG. 16A, the synchronization code embedded header includes four multiplexing symbols, which consist of two multiplexing symbols including channel ch0 of two consecutive bits in the MSB bit and channel ch1 of two consecutive bits in the LSB bit, and two multiplexing symbols including channel ch2 of two consecutive bits in the MSB bit and channel ch3 of two consecutive bits in the LSB bit.

The channels ch0 to ch3, each assigned to two multiplexing symbols include information relating to the channels ch0 to ch3 of payload data that is actual data. That is, each of the channels ch0 to ch3 includes a data identification bit and a DC control bit in two symbols of the multiplexing symbol. In the configuration according to the third embodiment, since each of the channels ch0 to ch3 is either the MSB bit or the LSB bit, for example, any bit in the payload data is set as an inverted bit in order to maintain the DC balance of the payload data.

In a synchronization code embedded header, a synchronization code is embedded in the multiplexing symbol including two bits of each of the channels ch0 and ch1 transmitted in the first half and removed in the second half, and a zero crossing transition of data is guaranteed. Accordingly, the number of bits of the channels ch0 and ch1, which can be used for the data identification bit and the DC control bit, is one bit. Meanwhile, a combination of the second channels ch0 and ch1 of the synchronization code embedded header does not guarantee a zero crossing transition of the data. Accordingly, the number of bits of the channels ch0 and ch1, which can be used for the data identification bit and the DC control bits is two bits.

Thus, a total of three bits can be used for the data identification bit and the DC control bits by the first and second channels ch0 of the synchronization code embedded header. That is, the channel ch0 can include 1-bit information as the data identification bit and the remaining 2-bit information as the DC control bits. The DC control bits of the channel ch0 can be transmitted by including, for example, information that a bit of the channel ch0 in the payload data is an inverted bit.

At this time, one bit of the DC control bits may include information on the channel ch0 of the first half of a data string of the payload data, and the other one bit of the DC control bits may include information on the channel ch0 of the second half. Alternatively, one bit of the DC control bits may include information on the channel ch0 of an odd symbol of the multiplexing symbol of the payload data, and the other one bit of the DC control bits may include information on the channel ch0 of an even symbol of the multiplexing symbol.

Likewise, the first and second channels ch1 of the synchronization code embedded header can include 1-bit information as the data identification bit and include the remaining 2-bit information as the DC control bits. The DC control bits of the channel ch1 can be transmitted by including information that a bit of the channel ch1 in the payload data is an inverted bit.

Likewise, one bit of the DC control bits may include information on the channel ch1 of the first half of a data string of the payload data, and the other 1 bit of the DC control bits may include information on the channel ch1 of the second half. Alternatively, one bit of the DC control bits may include information on the channel ch1 of the odd symbol in the multiplexing symbol of the payload data, and the other one bit of the DC control bits may include information on the channel ch1 of the even symbol in the multiplexing symbol.

Meanwhile, the multiplexing symbol using the channels ch2 and ch3 does not guarantee a zero crossing transition of data. Accordingly, the channels ch2 and ch3, each having two symbols of the multiplexing symbol, can use all four bits as the DC control bits and the data identification bits. Thus, each of the channels ch2 and ch3 can include 1-bit information as the data identification bit and the remaining 3-bit information as the DC control bits.

The DC control bits of the channels ch2 and ch3 can be transmitted by including, for example, information that bits of the corresponding channels ch2 and ch3 in the payload data are inverted bits. At this time, three bits of the DC control bits may be used to include information on the channels ch2 and ch3 of the first half of a data string in the payload data, and on the channels ch2 and ch3 in the middle thereof, and the channels ch2 and ch3 of the second half thereof.

For example, an encoding process of a 64B66B method can be used to generate such a synchronization code embedded header.

FIG. 16B illustrates a state of the payload data when one bit of the DC control bits of the channels ch0 and ch1 includes information that bits of the channels ch0 and ch1 in payload data are inverted bits. In this case, the bit data of all the channels ch0 and ch1 in the payload data are inverted bits. Hatching of the channels ch0 and ch1 in FIG. 16B indicates that the bit data of channels ch0 and ch1 are inverted bits.

FIG. 16C illustrates a state of the payload data when one bit of the DC control bits of channel ch2 includes information that a bit of the channel ch2 in the payload data is an inverted bit. In this case, the bit data of all the channels ch2 in the payload data are inverted bits. Hatching of the channel ch2 in FIG. 16C indicates that the bit data of the channel ch2 are inverted bits.

FIG. 16D illustrates a state of the payload data when one bit of the DC control bits of the channel ch3 includes information that a bit of the channel ch3 in the payload data is an inverted bit. In this case, the bit data of all the channels ch3 in the payload data are inverted bits. Hatching of the channel ch3 in FIG. 16D indicates that the bit data of the channel ch3 are inverted bits.

Regardless of the examples of FIGS. 16B to 16D, the above-described method may be applied to one or more of the channels ch0 to ch3 by using two bits of the channel ch0 in the payload data and three bits of the channels ch1 to ch3, respectively.

FIGS. 17A to 17D are diagrams illustrating a configuration of a synchronization code embedded header added to data in the memory system 1b according to the third embodiment. In FIGS. 17A to 17D, the synchronization code embedded header is hatched.

As illustrated in FIGS. 17A to 17D, in order to guarantee zero crossing of data in a combination of the first channels ch0 and ch1 of the synchronization code embedded header, that is, in the first one symbol of the multiplexing symbol, another condition is given to the combination of the channels ch0 and ch1, i.e., codes are assigned such that two bits of the first channel ch0 of the synchronization code embedded header become a code 01 or a code 10 and two bits of the first channel ch1 of the synchronization code embedded header become a code 01 or a code 10. FIGS. 17A to 17D illustrate all combinations.

FIG. 17A illustrates a case where both two bits of the first channel ch0 and two bits of the first channel ch1 are a code 01. FIG. 17B illustrates a case where the two bits of the first channel ch0 are a code 10 and the two bits of the first channel ch1 are the code 01. FIG. 17C illustrates a case where the two bits of the first channel ch0 are the code 01 and the two bits of the first channel ch1 are the code 10. FIG. 17D illustrates a case where both the two bits of the first channel ch0 and the two bits of the first channel ch1 are the code 10.

As illustrated in FIGS. 17A to 17D, the data can undergo a zero crossing transition in all the combinations of the first channels ch0 and ch1.

Comparative Example

A memory system according to a comparative example not having the above-described configuration has the above-described problem of how to guarantee the DC balance and the zero crossing transition.

According to the memory system 1b of the third embodiment, a synchronization code is embedded in a multiplexing symbol by the channels ch0 and ch1 which are transmitted in the first half and removed in the second half in the synchronization code embedded header. Thereby, a zero crossing transition of data is guaranteed while passing through the bridge circuits 310-340.

According to the memory system 1b of the third embodiment, a large number of DC control bits and the like can be assigned to the other channels ch2 and ch3 in the synchronization code embedded header. Thereby, a DC balance of each channel in payload data can be controlled. Thus, it is possible to reduce the redundancy of the payload data and to increase an effective data rate.

According to the memory system 1b of the third embodiment, a particular code inserted into a multiplexing symbol is an MSB bit at a location corresponding to an LSB bit from which data are removed, or data of an LSB bit at a location corresponding to the MSB bit from which data are removed, or inverted data thereof. Thereby, a DC balance is easily ensured.

According to the memory system 1b of the third embodiment, a particular code inserted into the multiplexing symbol is a code 01 or a code 10. Thereby, a DC balance is easily ensured.

Other Embodiments

In the first to third embodiments described above, a case where the bridge communication system is a memory system including a plurality of memories, and the bridge communication system is not limited to this. The bridge communication system may be a system other than the memory system as long as the system has a configuration other than the memory and has a configuration becoming a data transmission object.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a first nonvolatile memory;
   a first bridge circuit connected to the first nonvolatile memory;
   a second nonvolatile memory;
   a second bridge circuit connected to the second nonvolatile memory and connected to the first bridge circuit; and
   a controller connected to the first bridge circuit and configured to output, to the first bridge circuit, first data to be stored in the first nonvolatile memory and second data to be stored in the second nonvolatile memory, the first and second data being mapped to one or more multiplexing symbols, each of the multiplexing symbols including a pair of symbols corresponding to a pair of a most significant bit and a least significant bit, the first data being mapped to either one of the most significant bit and the least significant bit, the second data being mapped to the other of the most significant bit and the least significant bit,
   wherein the first bridge circuit is configured to
      upon receipt of the multiplexing symbols, extract the first data from the multiplexing symbols,
      store the first data in the first nonvolatile memory,
      generate third data using either: one of a most significant bit and a least significant bit corresponding to each of the symbols to which the second data is mapped, or an inverted bit of the one of the most significant bit and the least significant bit, and insert the generated third data into the multiplexing symbols to which the first data was mapped, and
      output to the second bridge circuit the multiplexing symbols into which the third data has been inserted.

2. The memory system according to claim 1, wherein the controller comprises a multiplexer configured to
   upon receipt of data from a host, encode most significant bits and least significant bits based on the received data such that a DC balance of the encoded most significant and least significant bits is maintained, and
   map the encoded most significant and least significant bits to the multiplexing symbols using linear mapping.

3. The memory system according to claim 2, wherein each of the multiplexing symbols includes PAM4 symbols.

4. The memory system according to claim 1, wherein the controller is configured to output header data including a synchronization code mapped to one or more multiplexing symbols.

5. The memory system according to claim 4, wherein The synchronization code is mapped to 2 symbols of the multiplexing symbols.

6. The memory system according to claim 4, wherein the synchronization code is mapped to 3 symbols of the multiplexing symbols.

7. The memory system according to claim 4, wherein each bit of data included in a first symbol and a second symbol of the multiplexing symbols of the header is encoded independently of each other.

8. The memory system according to claim 1, wherein the multiplexing symbols include a first multiplexing symbol to which the first data is mapped and a second multiplexing symbol to which the second data is mapped,
   the controller is configured to output first header data corresponding to the first data and second header data corresponding to the second data,
   the first and second header data mapped to a third and a fourth multiplexing symbol, respectively, and
   the second header data includes a synchronization code including two PAM4 symbols that cause a zero crossing transition when modulated into a signal in PAM communication.

9. The memory system according to claim 8, wherein the third data generated by the first bridge circuit is a synchronization code including two PAM4 symbols that cause a zero crossing transition when modulated into a signal in PAM communication.

10. The memory system according to claim 8, wherein the third data is determined according to values of preceding or subsequent symbols to the symbol that were extracted by the first bridge circuit.

11. The memory system according to claim 1, further comprising:
    a third nonvolatile memory;
    a third bridge circuit connected to the third nonvolatile memory and connected to the second bridge circuit;
    a fourth nonvolatile memory; and
    a fourth bridge circuit connected to the fourth nonvolatile memory and connected to the third bridge circuit, wherein the controller is configured to output the first data, the second data, fourth data to be stored in the third nonvolatile memory, and fifth data to be stored in the fourth nonvolatile memory,
  the first, second, fourth, and fifth data mapped to a first, a second, a third, and a fourth multiplexing symbol, respectively,
  the fourth, second, third, and first multiplexing symbols being arranged in this order, and
after the controller outputs the multiplexing symbols, the first, second, third, and fourth bridge circuits extract the first, second, fourth, and fifth data, respectively.

12. The memory system according to claim 11, wherein the controller is configured to generate first, second, third, and fourth header data corresponding to the first, second, fourth, and fifth data, respectively,
  the first, second, third, and fourth header data being mapped to a fifth, a sixth, a seventh, and an eighth multiplexing symbol, respectively,
  the eighth, sixth, seventh, and fifth multiplexing symbols being arranged in this order, and
the fourth header data includes a DC control bit for controlling a DC balance of the fifth data, and
the first, second, and third header data each include three DC control bits for controlling a DC balance of the first, second, and fourth data.

13. The memory system according to claim 1, wherein the first and second data are multiplexed in at least a time direction,
the multiplexing symbols include
  a first multiplexing symbol including four symbols for storing a first portion of the first data by two adjacent symbols in the time direction and a first portion of the second data by the other two adjacent symbols in the time direction, and
  a second multiplexing symbol including four symbols for storing a second portion of the first data by two adjacent symbols in the time direction and a second portion of the second data by the other two adjacent symbols in the time direction, and
the controller is configured to output first header data corresponding to the first data and second header data corresponding to the second data,
  the first and second header data being mapped to a plurality of multiplexing symbols including
    a third multiplexing symbol including four symbols and to which a first portion of the first header data is mapped using two adjacent symbols in the time direction and a first portion of the second header data is mapped using two adjacent symbols in the time direction, and
    a fourth multiplexing symbol including four symbols and to which a second portion of the first header data is mapped using two adjacent symbols in the time direction and a second portion of the second header data is mapped using two adjacent symbols in the time direction, and
the first portion of the first header data includes a synchronization code represented by 01 or 10.

14. The memory system according to claim 13, wherein the first bridge circuit is configured to
  upon receipt of the multiplexing symbols from the controller, extract the first and second portions of the first data from the first and second multiplexing symbols,
  store the first and second portions of the first data in the first nonvolatile memory,
  insert the first and second portions of the second data or inverted first and second portions of the second data into the first and second multiplexing symbols where the first and second portions of the first data were stored, and
  output to the second bridge circuit the multiplexing symbols into which the first and second portions of the first data or inverted first and second portions of the second data have been inserted data.

15. The memory system according to claim 14, wherein the inserted first and second portions of the second data are represented by 01 or 10.

16. The memory system according to claim 13, wherein the first bridge circuit is configured to
  upon receipt of the multiplexing symbols from the controller, extract the first and second portions of the first data from the first and second multiplexing symbols,
  store the first and second portions of the first data in the first nonvolatile memory,
  generate fourth data based on data adjacent to the extracted first and second portions of the first data,
  insert the fourth data into the first and second multiplexing symbols where the first and second portions of the first data were stored, and
  output to the second bridge circuit the multiplexing symbols into which the fourth data has been inserted.

17. The memory system according to claim 13, wherein the first and second portions of the first header data includes three DC control bits for controlling a DC balance of the first data, and
the first and second portions of the second header data includes three DC control bits for controlling the DC balance of the second data, and wherein the controller is configured to output another header data corresponding to another data, the another header data including two DC control bits for controlling the DC balance of the another data.

18. A semiconductor integrated circuit connectable to a first nonvolatile memory and another semiconductor integrated circuit connectable to a second nonvolatile memory different from the first nonvolatile memory, comprising:
  a first circuit by which one or more multiplexing symbols to which first data to be stored in the first nonvolatile memory and second data to be stored in the second nonvolatile memory are mapped, are received, each of the multiplexing symbols including a pair of symbols corresponding to a pair of a most significant bit and a least significant bit, the first data being mapped to either one of the most significant bit and the least significant bit, the second data being mapped to the other of the most significant bit and the least significant bit; and
  a second circuit configured to
    upon receipt of the multiplexing symbols, extract the first data from the multiplexing symbols,
    store the first data in the first nonvolatile memory,
    generate third data using either: one of a most significant bit and a least significant bit corresponding to each of the symbols to which the second data is mapped, or an inverted bit of the one of the most significant bit and the least significant bit, and insert the generated third data into the multiplexing symbols to which the first data was mapped, and
    output to said another semiconductor integrated circuit the multiplexing symbols into which the third data has been inserted.

19. A method for storing data in a memory system including a first nonvolatile memory, a first bridge circuit connected to the first nonvolatile memory, a second nonvolatile memory, and a second bridge circuit connected to the second nonvolatile memory and the first bridge circuit, the method comprising:
- outputting first data to be stored in the first nonvolatile memory and second data to be stored in the second nonvolatile memory, the first and second data being mapped to one or more multiplexing symbols, each of the multiplexing symbols including a pair of symbols corresponding to a pair of a most significant bit and a least significant bit, the first data being mapped to either one of the most significant bit and the least significant bit, the second data being mapped to the other of the most significant bit and the least significant bit;
- receiving the multiplexing symbols by the first bridge circuit;
- extracting the first data from the multiplexing symbol;
- storing the first data in the first nonvolatile memory;
- generating third data using either: one of a most significant bit and a least significant bit corresponding to each of the symbols to which the second data is mapped, or an inverted bit of the one of the most significant bit and the least significant bit, and insert the generated third data into the multiplexing symbol at a location to which the first data was mapped; and
- outputting the multiplexing symbol into which the third data has been inserted, to the second bridge circuit.

* * * * *